Aug. 18, 1936.   J. W. McCARTHY   2,051,308
BOX MAKING MACHINE
Filed Oct. 17, 1934    16 Sheets-Sheet 1

Inventor:
John W. McCarthy,
By Walter M. Fuller
Atty.

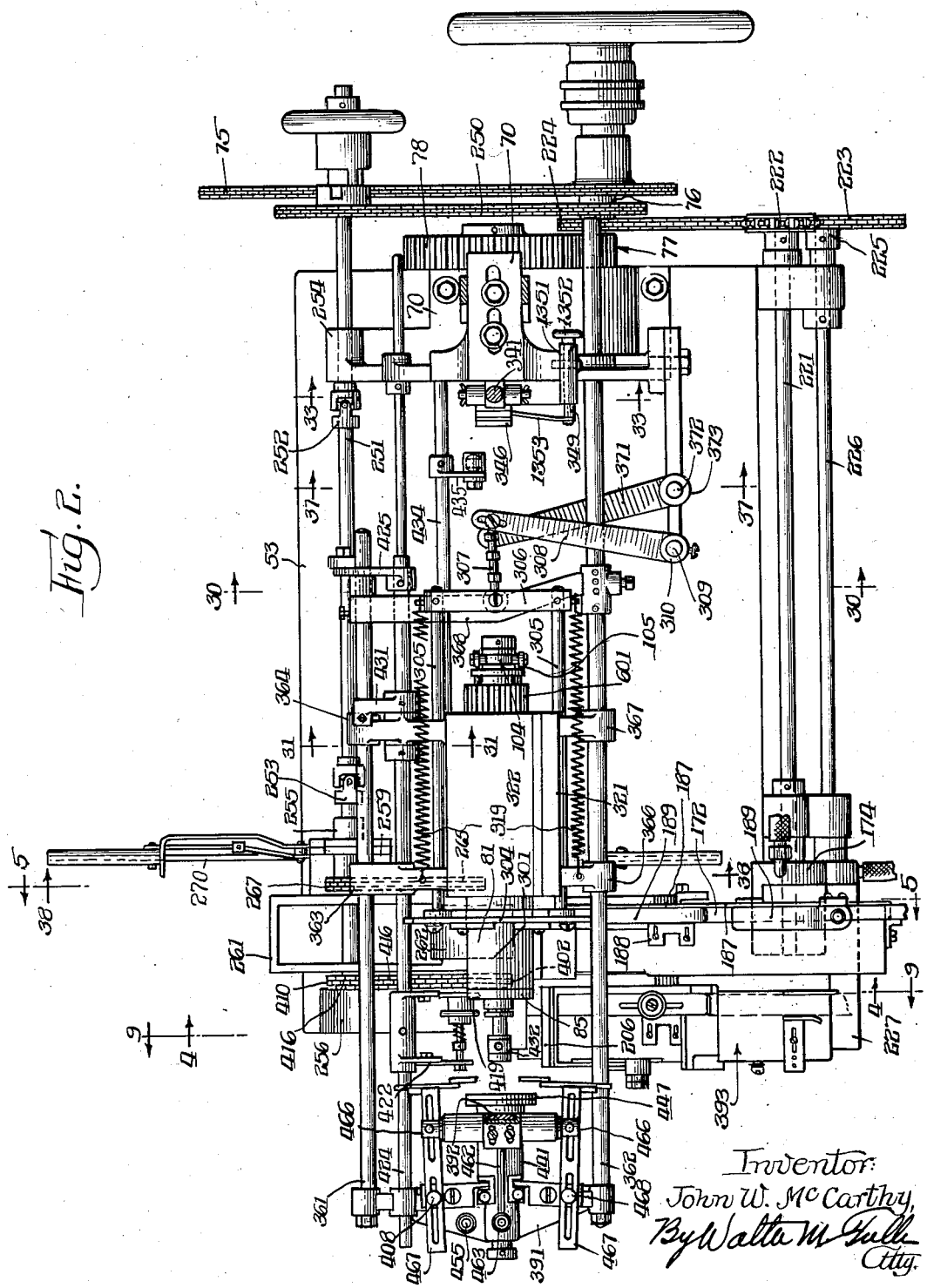

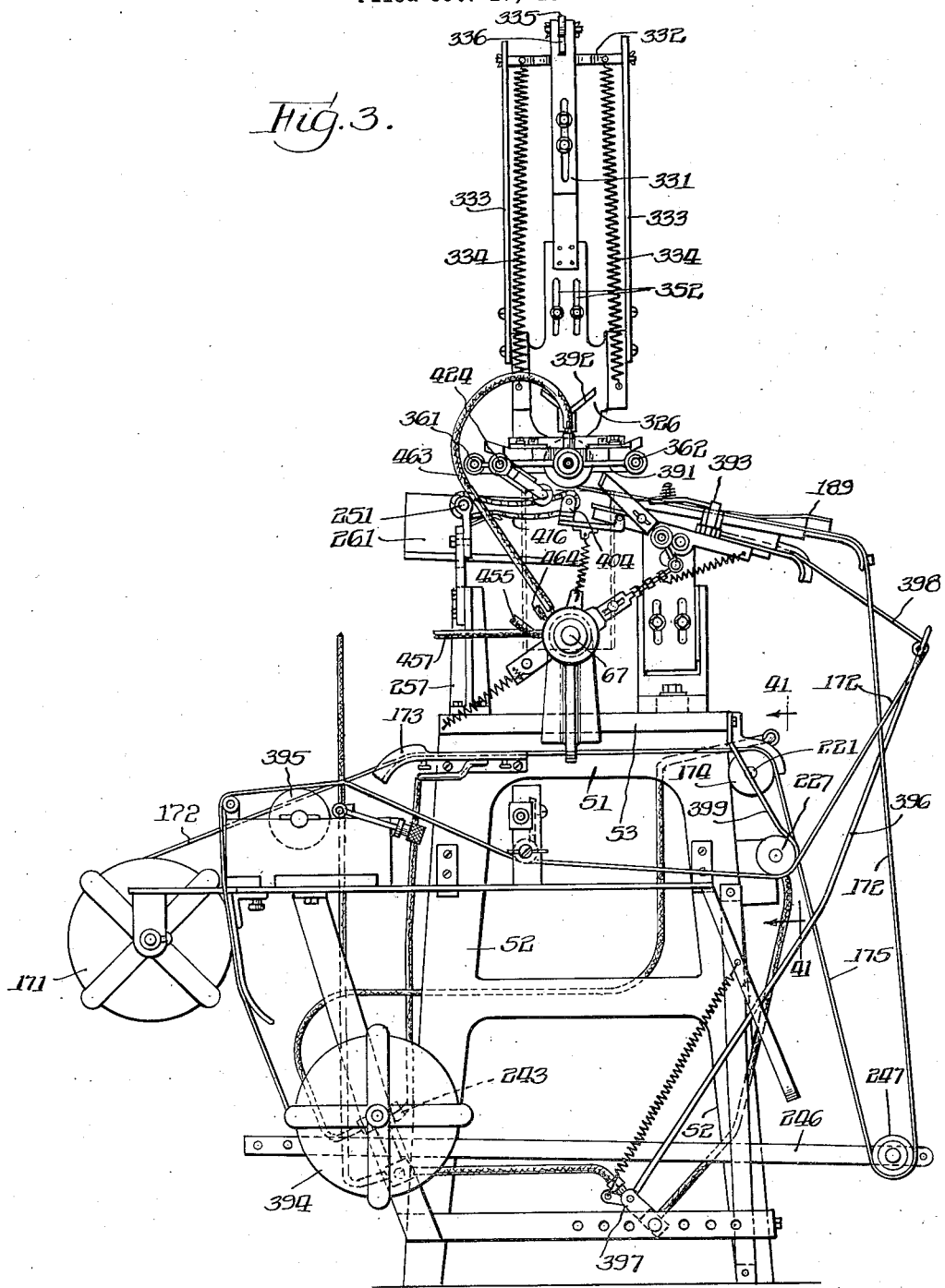

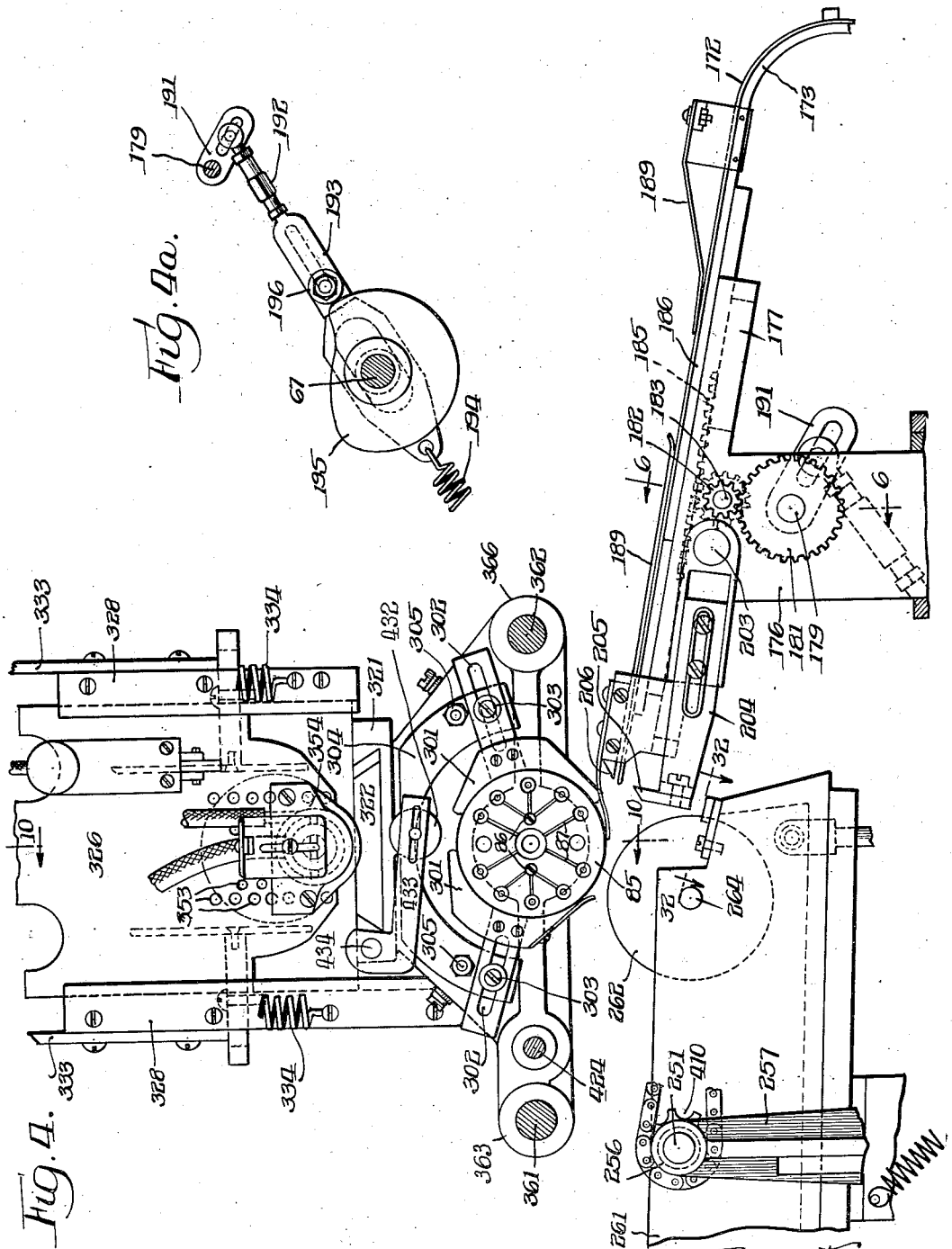

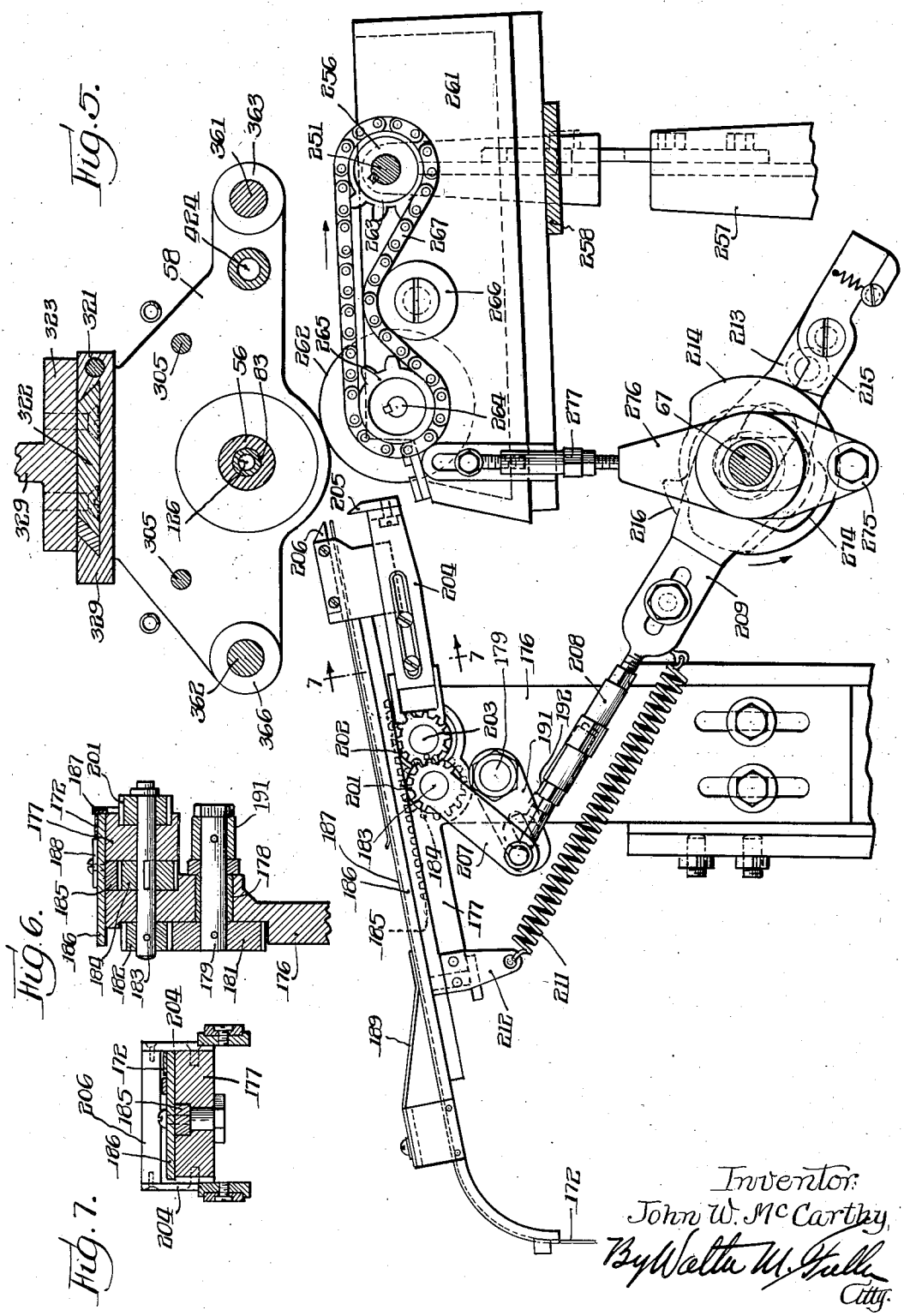

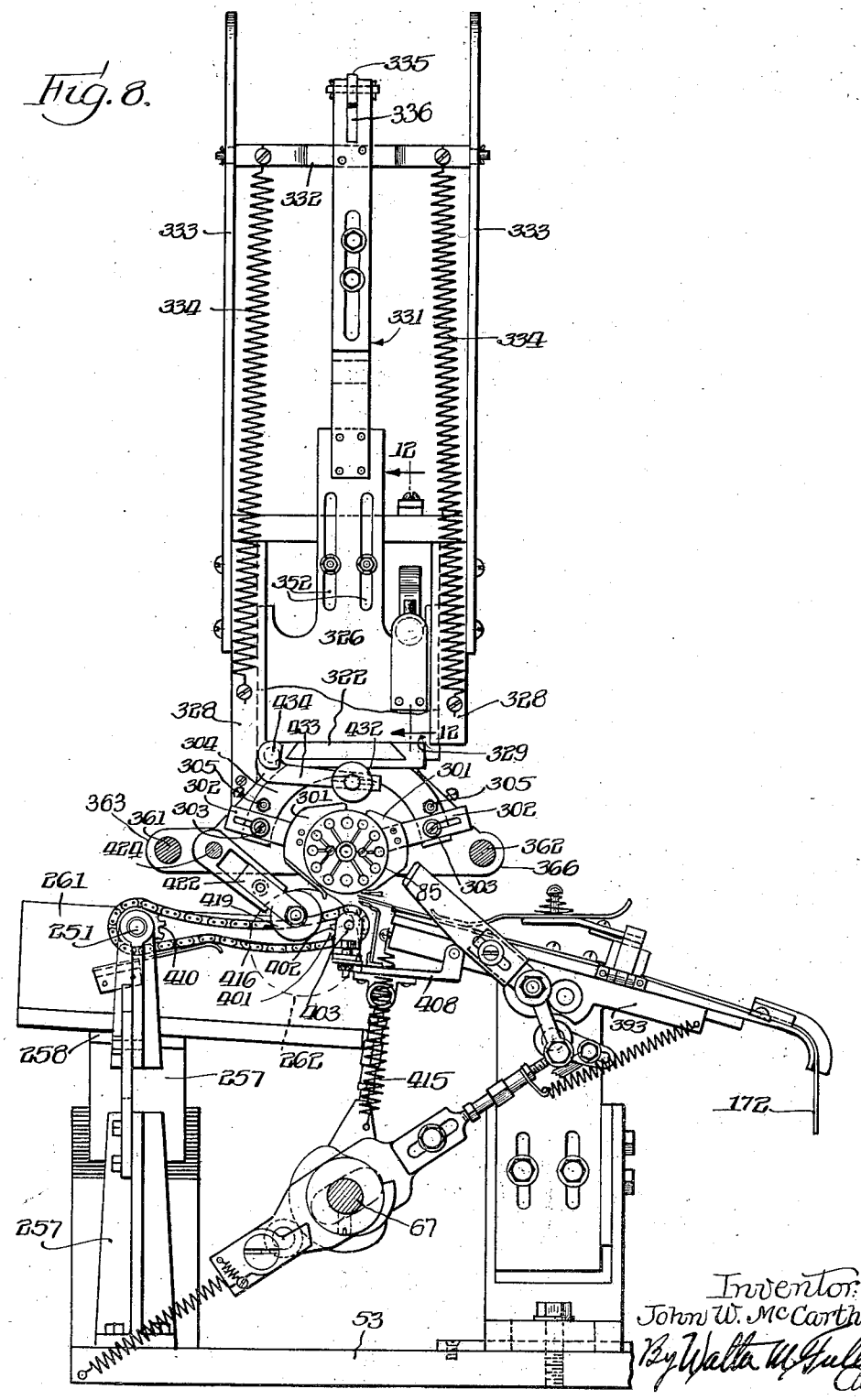

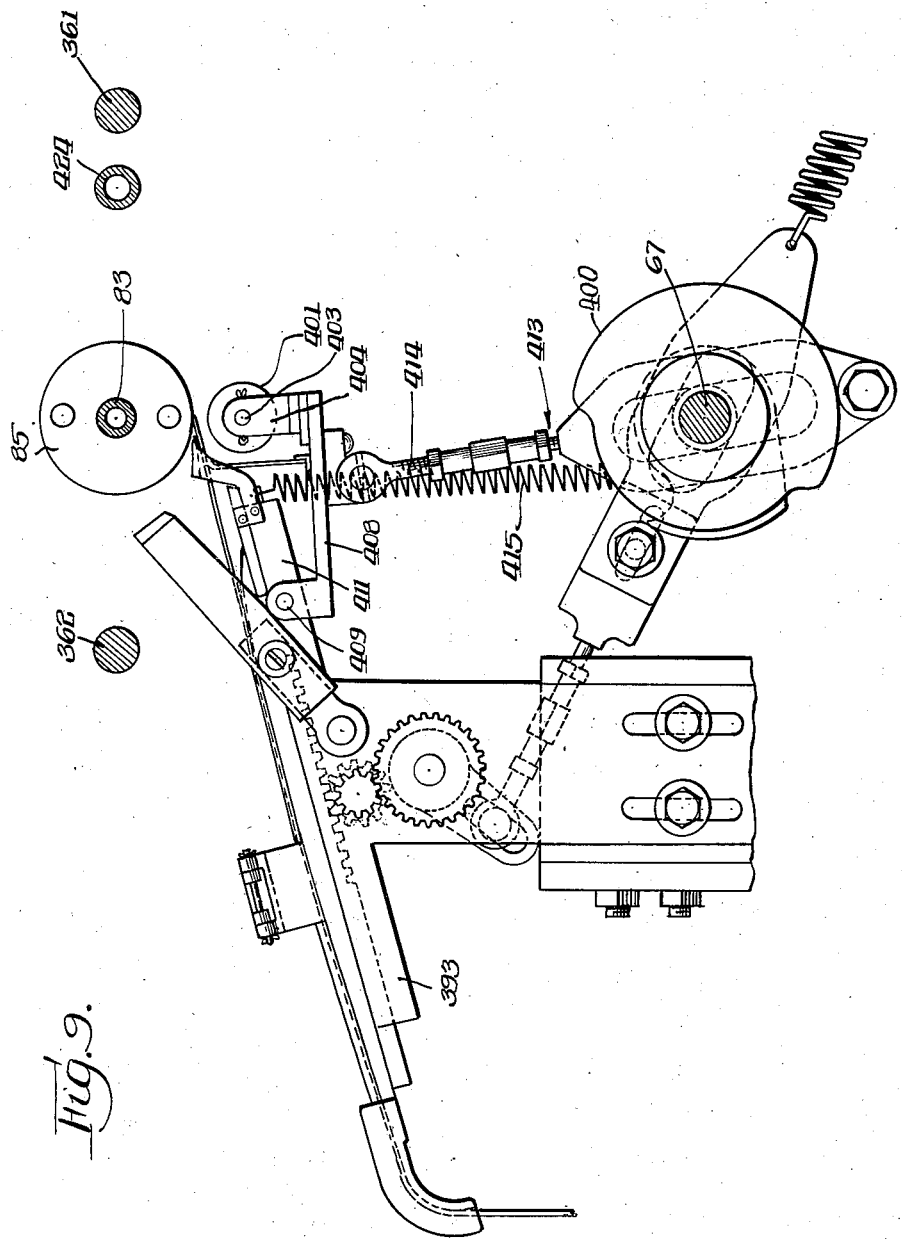

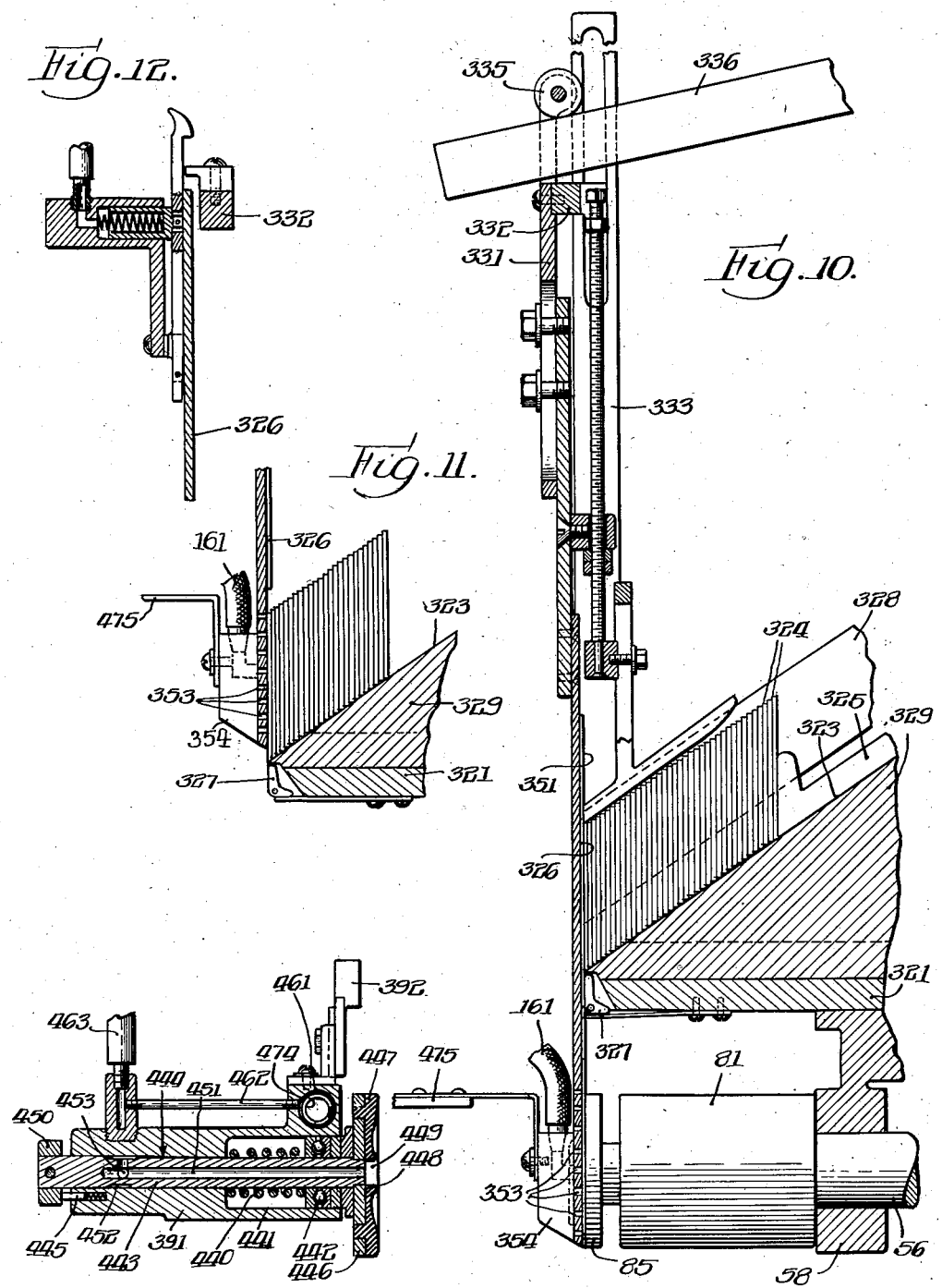

Aug. 18, 1936.    J. W. McCARTHY    2,051,308
BOX MAKING MACHINE
Filed Oct. 17, 1934    16 Sheets-Sheet 9
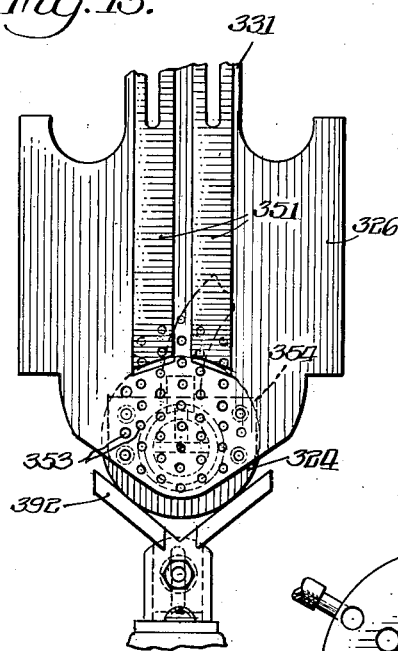
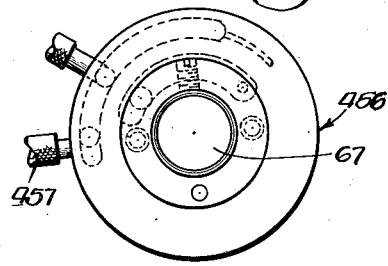
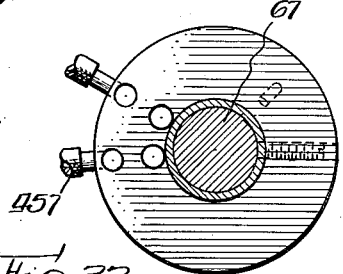
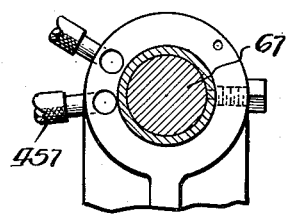
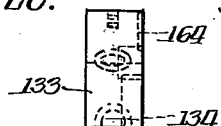
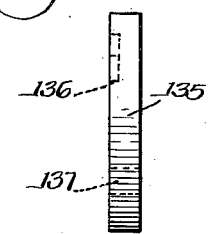
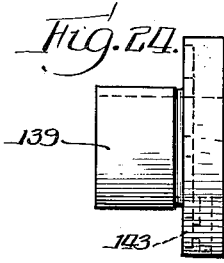
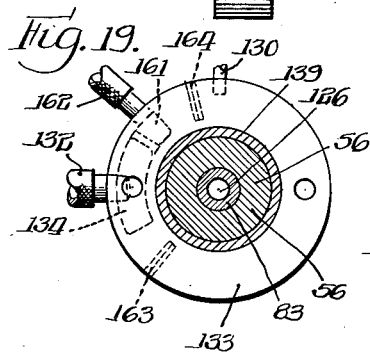
Inventor:
John W. McCarthy,
By Walter M Fuller Atty.

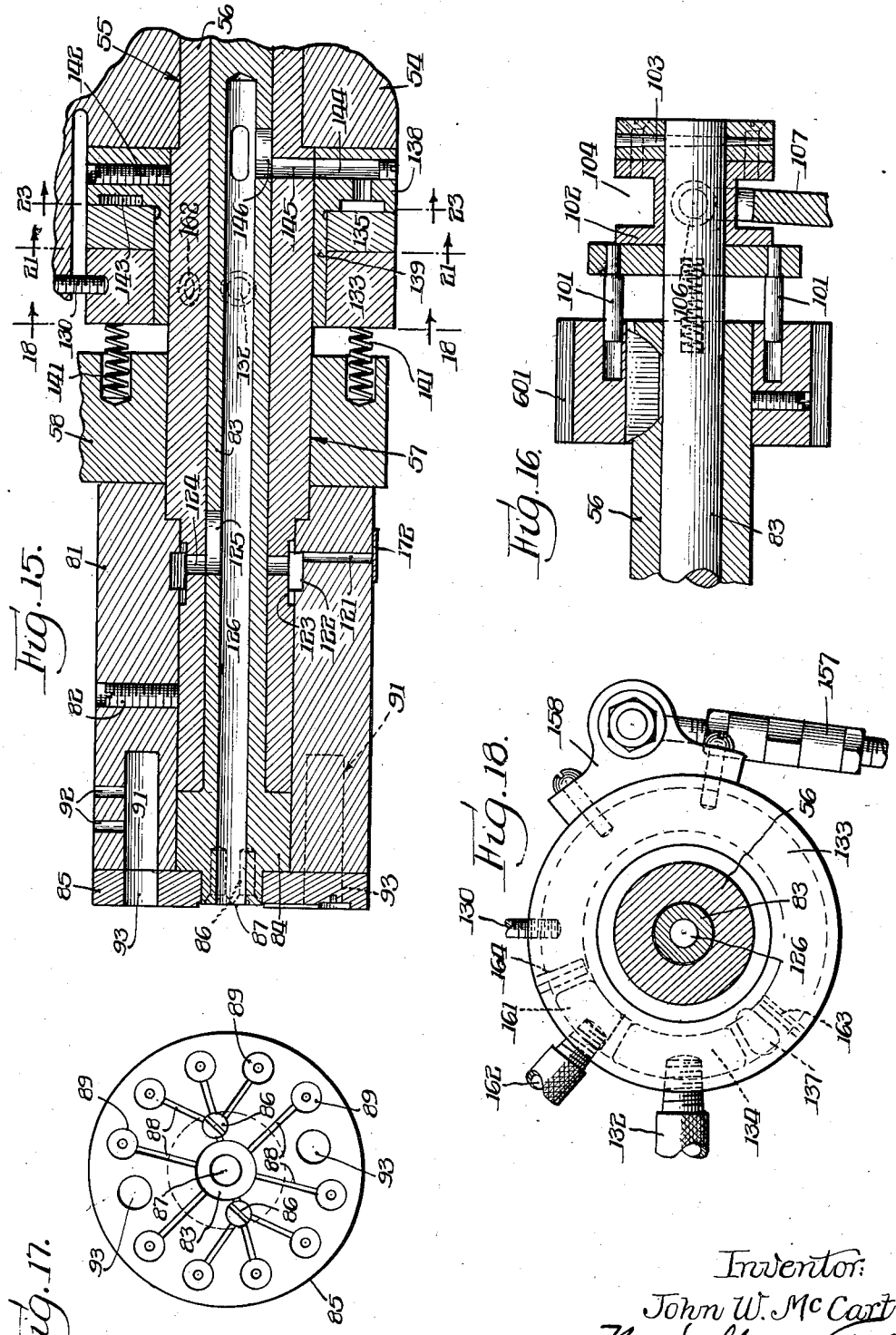

Aug. 18, 1936.    J. W. McCARTHY    2,051,308
BOX MAKING MACHINE
Filed Oct. 17, 1934    16 Sheets-Sheet 11
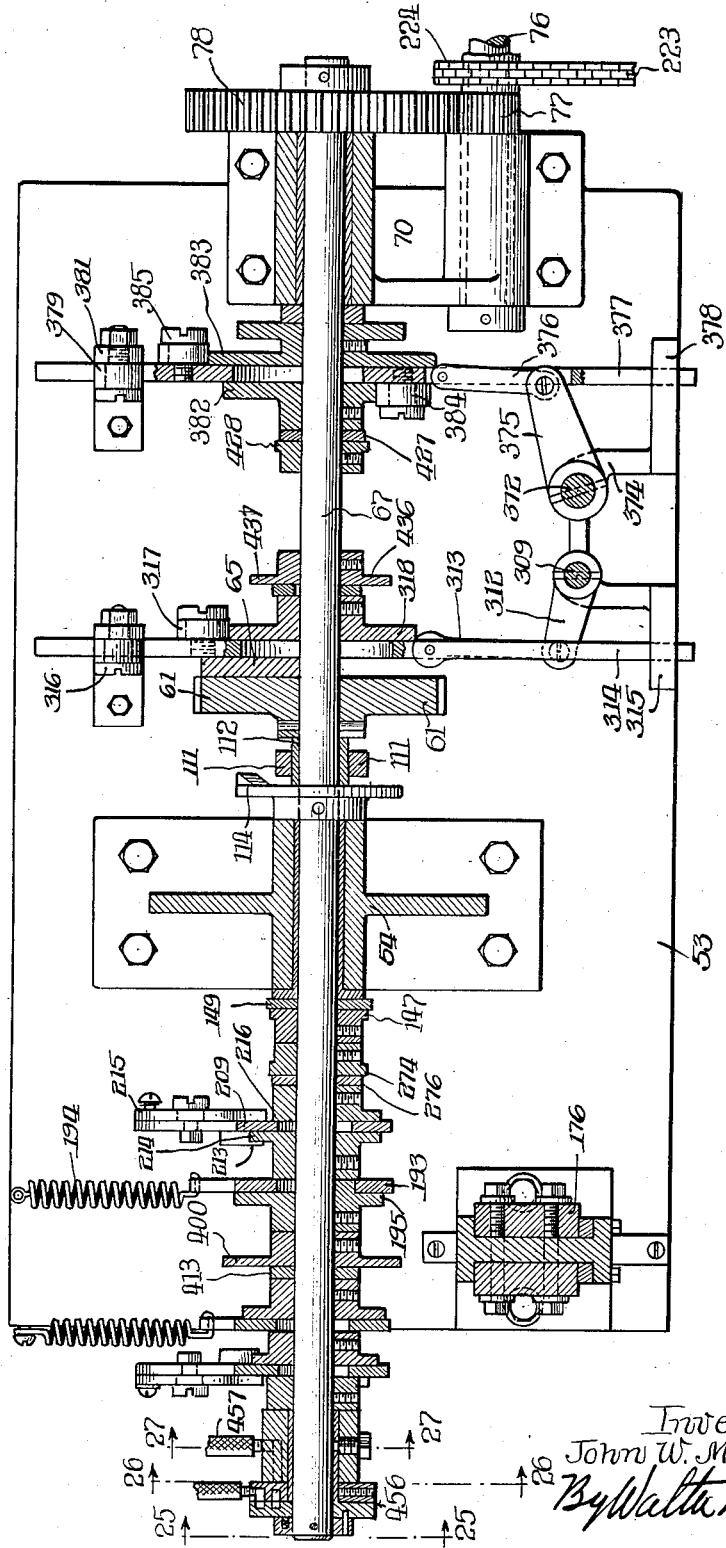

Aug. 18, 1936.  J. W. McCARTHY  2,051,308
BOX MAKING MACHINE
Filed Oct. 17, 1934  16 Sheets-Sheet 12
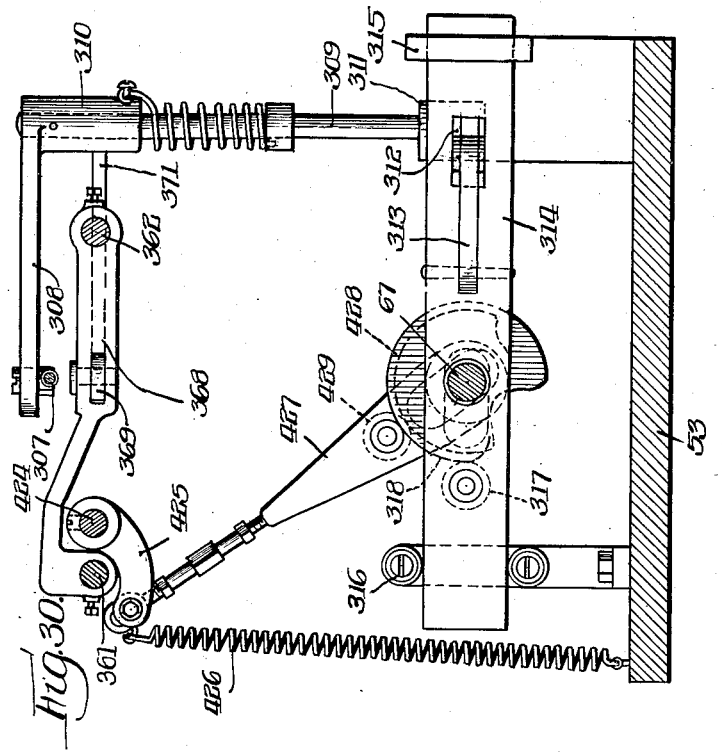
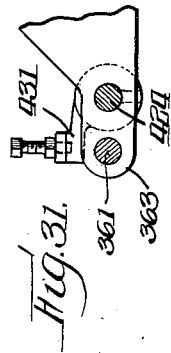
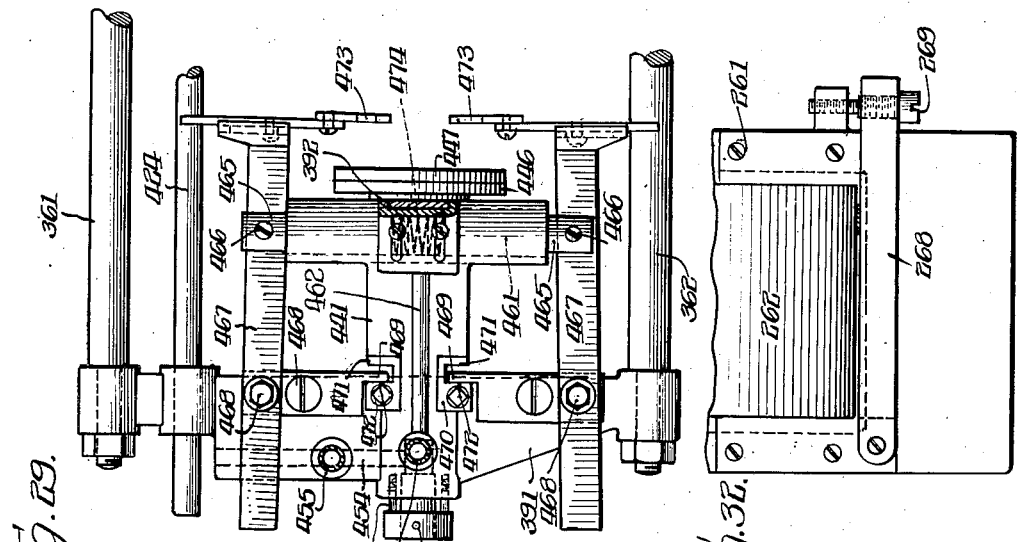
Inventor:
John W. McCarthy,
By Walter M. Fuller
Atty.

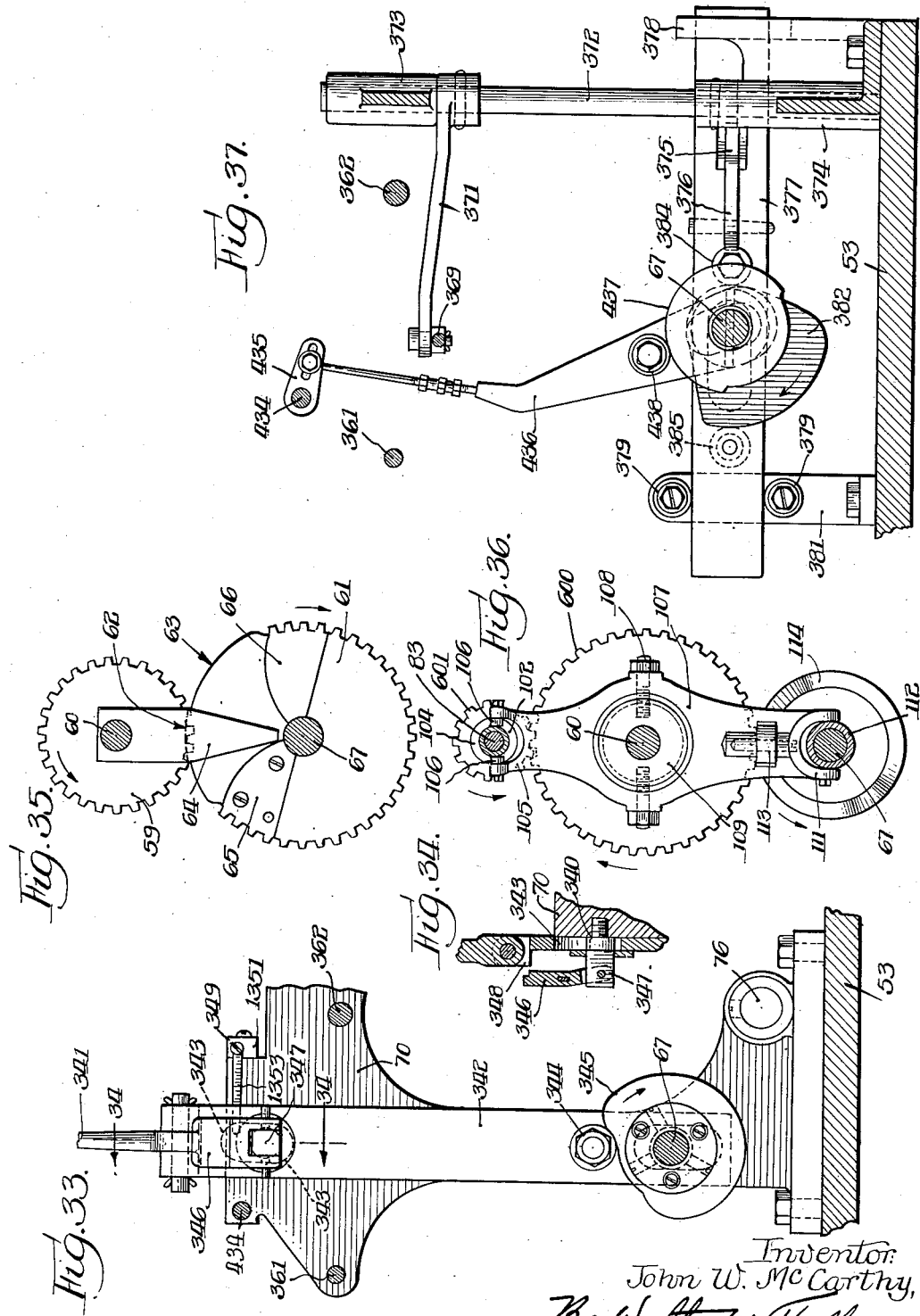

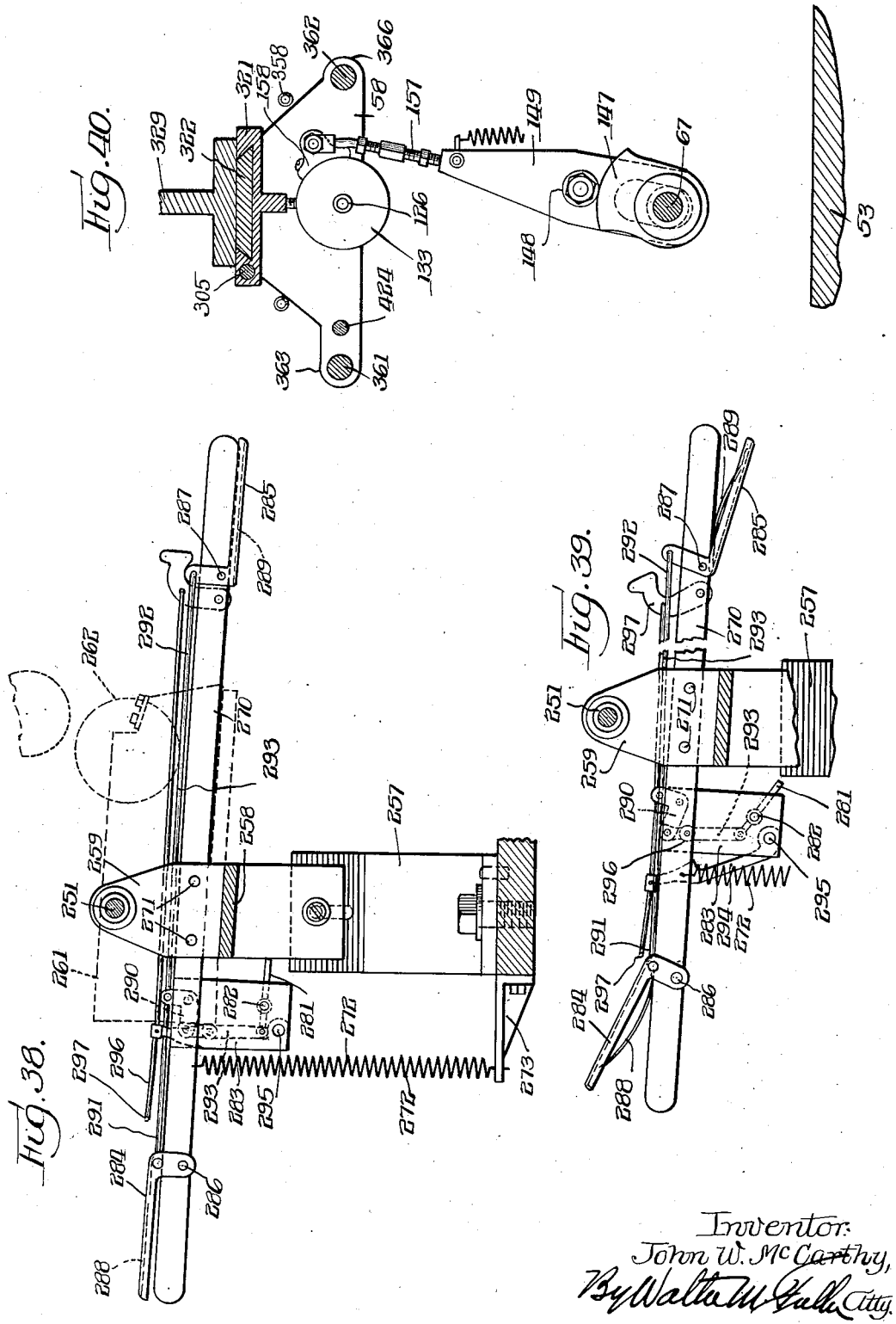

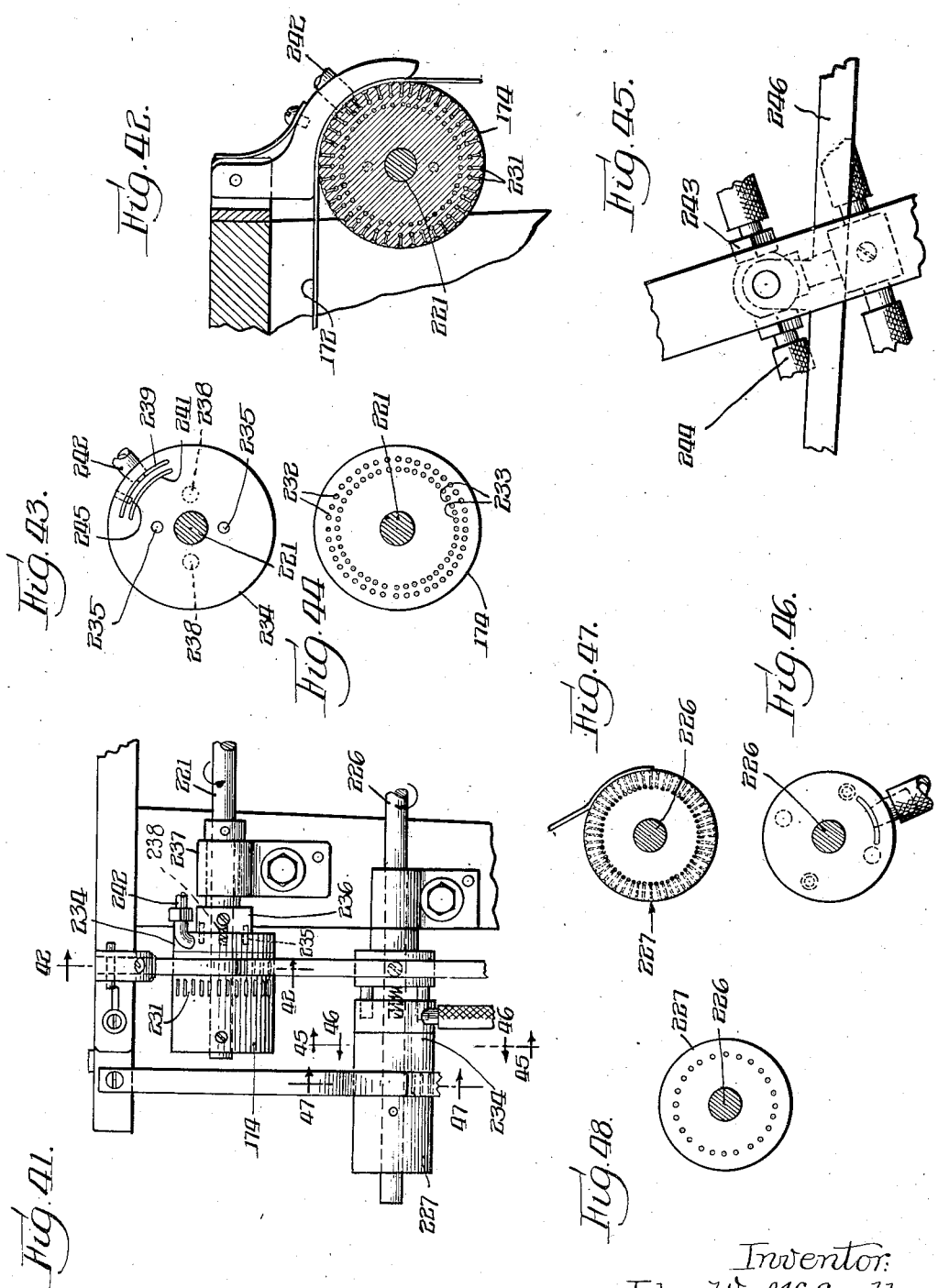

Aug. 18, 1936.  J. W. McCARTHY  2,051,308

BOX MAKING MACHINE

Filed Oct. 17, 1934  16 Sheets-Sheet 16

Inventor:
John W. McCarthy,
By Walter M. Fuller
Atty.

Patented Aug. 18, 1936

2,051,308

UNITED STATES PATENT OFFICE 2,051,308

BOX MAKING MACHINE

John W. McCarthy, Lockport, N. Y., assignor to W. C. Ritchie and Company, Chicago, Ill., a corporation of Illinois Application October 17, 1934, Serial No. 748,575

15 Claims. (Cl. 93—39)

One object of the present invention is to provide a machine for making pasteboard boxes or box-elements (a) which will avoid the use of a turret with its objectionable intermittent jarring action and which when incorporated in the machine slows down its operation, (b) which will handle a dry base or flange pasteboard strip and apply the glue thereto as it is wound on the revolving form, (c) which will avoid the use of a reciprocating form, thereby saving time, (d) which will have relatively few moving parts, (e) which may be run at high speed (f) which will prevent misapplication and skidding of the cover-paper, (g) which is capable of using straight-grain extended-edge paper, (h) which will produce a high-grade of product, (i) which will function with a minimum waste of material, and (j) which embodies simplicity of adjustment and small cost of change of parts to produce boxes of different sizes.

To the accomplishment of these and other desirable aims and purposes, a present preferred embodiment of the invention has been produced which is described in detail below both as to structure and mode of operation and which is presented in the accompanying drawings forming a part of this specification and throughout the several views of which like reference numerals have been used to designate the same structural parts.

In these drawings, various parts of the mechanism, in some of the views, have been omitted or cut away to indicate more clearly those portions of the appliance shown, and a number of the specified sections are on a larger scale than that of the figures on which the section lines are defined.

In such drawings:—

Figure 2 is a plan of the machine on a somewhat larger scale;

Figure 3 is a front end elevation of the appliance;

Figure 4 is a fragmentary, vertical cross-section on line 4—4 of Figure 2 on an enlarged scale;

Figure 4a illustrates an extension of a part of the mechanism presented in Figure 4;

Figure 5 is a vertical cross-section on line 5—5 of Figure 2;

Figure 6 is a cross-section on line 6—6 of Figure 4;

Figure 7 is a small cross-section on line 7—7 of Figure 5;

Figure 8 is a vertical section on an enlarged scale of a portion of the machine on line 8—8 of Figure 1;

Figure 9 is a section of a part of the machine on line 9—9 of Figure 2;

Figure 10 is a section on line 10—10 of Figure 4 and shows more particularly the box-head delivering portion of the appliance;

Figure 11 is a section of a part of the mechanism depicted in Figure 10;

Figure 12 is a detailed section on line 12—12 of Figure 8 and presents the means for controlling the action of the head-feeding slide;

Figure 13 illustrates the means for registering the box-head in proper position;

Figure 14 shows the means for applying suction to the box-head;

Figure 15 is an enlarged cross-section through the combined form-and-folder on which the pasteboard strip is wound to make the flange, the associated support for holding the flange and head while they are being bound together by the cover-paper, and associated parts of the mechanism;

Figure 16 is a section depicting a part of the machine to the right of that shown in Figure 15;

Figure 17 is a face view of the stripping-support carrying the box parts while they are being covered with the paper;

Figure 18 is a cross-section on line 18—18 of Figure 15 illustrating the valve-mechanism for controlling the suction applied to the combined form-and-folder and to the support;

Figure 19 is a section substantially on line 18—18 of Figure 15 on a reduced scale and shows in side elevation the stationary one of the three members of the suction-controlling valve;

Figure 20 is an edge view of the part shown in Figure 19;

Figure 21 is a similar section on line 21—21 of Figure 15 presenting in side elevation the oscillatory, intermediate member of the three-part suction-governing valve;

Figure 22 is an edge elevation of the valve member shown in Figure 21;

Figure 23 is a similar section on line 23—23 of Figure 15 and illustrates the third rotary member of the suction-valve;

Figure 24 is an edge view of the valve-element depicted in Figure 23;

Figure 25 is an end view as shown by the line 25—25 on Figure 28;

Figure 26 is a section on line 26—26 on Figure 28;

Figure 27 is a section on line 27—27 on Figure 28;

Figure 28 is an enlarged, horizontal section on line 28—28 of Figure 1;

Figure 29 is a plan view of the box delivering mechanism;

Figure 30 is a vertical cross-section on line 30—30 of Figure 2;

Figure 31 is a stop detail section on line 31—31 near the central portion of Figure 2;

Figure 32 is a section on line 32—32 at the lower part of Figure 4 and shows the adjustable scraper for the glue-roller;

Figure 33 is a section on line 33—33 of Figure 2 and presents a portion of the operating-mechanism for the feed of boxheads from the magazine;

Figure 34 is a small section on line 34—34 on Figure 33;

Figure 35 is a fragmentary section on line 35—35 of Figure 1 and illustrates the intermittent-rotation driving-mechanism for the combined form-and-folder;

Figure 36 is a section on line 36—36 at about the middle of Figure 1 and depicts the means for sliding the stripping-support which carries the finished, uncovered, box-flange during the paper-covering operation;

Figure 37 illustrates the means for actuating the presser mechanism and represents a section on line 37—37 of Figure 2;

Figure 38 is a section on line 38—38 of Figure 2 and portrays the hand-operated means for rendering the glue-pot and its roller inoperative;

Figure 39 shows the same mechanism with its parts in different positions;

Figure 1:
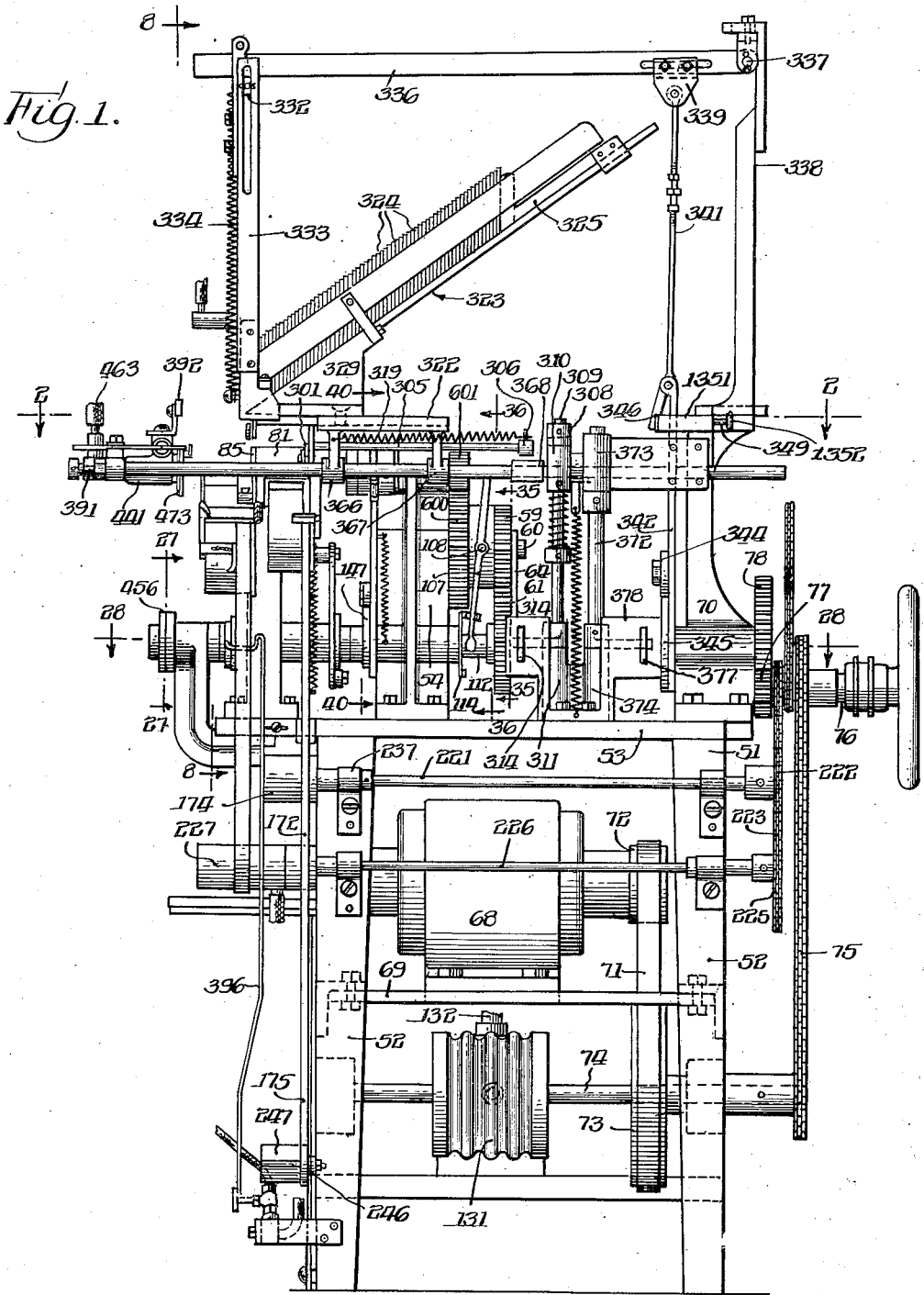
Figure 1 is a side elevation of the machine.
Figure 49:
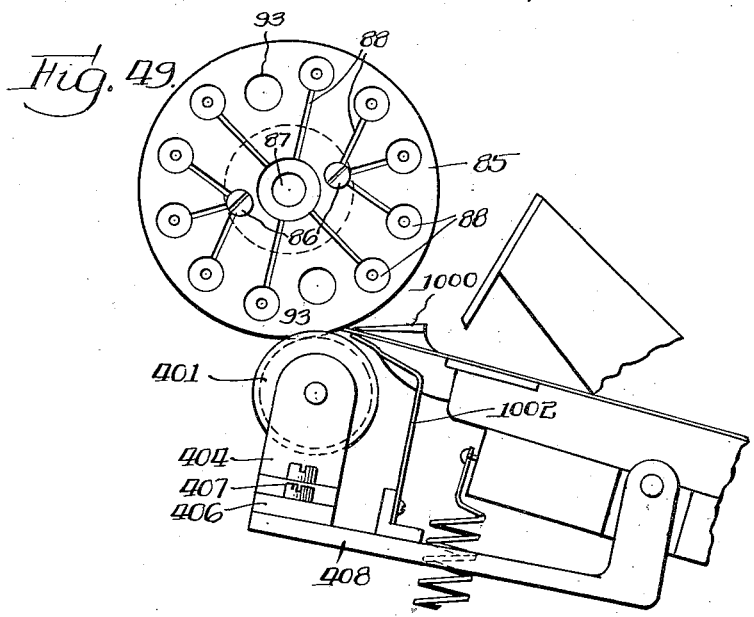
Figure 50:
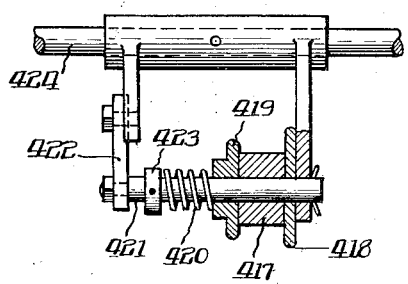
Figure 51:
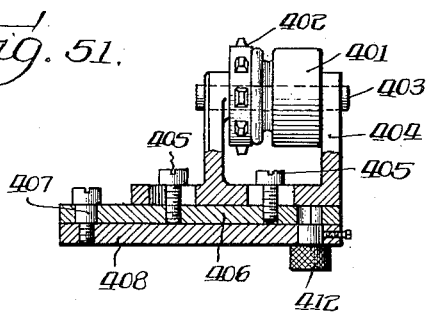

Figure 40, constituting a section on line 40—40 of Figure 1, presents the means for operating the suction-valve shown in the right-hand portion of Figure 15;

Figure 41 is a fragmentary elevation as viewed from the line 41—41 on Figure 3 and shows the suction feed-rollers for the pasteboard and paper strips;

Figure 42 is a section on line 42—42 of Figure 41;

Figures 43 and 44 are details of the suction feed-roller and valve-mechanism for the pasteboard-strip;

Figure 45 shows the valve controlling the suction application and cessation on the pasteboard-strip feeding-roller presented in Figures 41, 42 and 44;

Figures 46, 47, and 48 are details of the suction-roller for feeding the paper-strip;

Figure 49 is presented to show more particularly the means for holding or tensioning the trailing end portion of the cover-paper strip to prevent it from deflecting sidewise; and Figures 50 and 51 are details of the compound roller for applying the cover-paper to the box flange and head.

Referring to the various views in these drawings, it will be seen that the novel and improved machine includes a main-frame 51 affording supporting legs 52, 52 (Fig. 1) for a table-top 53 on which a suitable upright casting 54 is mounted, such member 54 (Fig. 15) having a bearing 55 for a shouldered, rotary sleeve 56 and also having another bearing 57 for the same sleeve in an overhanging part 58 of the casting.

Such non-reciprocatory sleeve 56 is rotated intermittently by any approved means, such, for example, as the intermeshing, mutilated gears 59 and 61 (Figs. 1 and 35) having interfitting, untoothed, concave and convex sections 62 and 63, respectively, which positively lock the driven gear 59 against revolution for a portion of the cycle.

As is indicated in Figure 1, the partial gear 59 is keyed on a jack-shaft 60 rotatable in suitable bearings in casting 54, such shaft being equipped with a larger gear 600 meshing with a smaller gear 601 keyed on the protruding end of sleeve 56 (Figs. 1 and 16), whereby sleeve 56 will make three complete revolutions and then remain stationary for a period corresponding to what would otherwise be two revolutions.

In order to initiate each such period of rotation of gear 59 and its connected sleeve 56 somewhat gradually rather than abruptly, the two gears 59 and 61 (Fig. 35) are supplied with cooperating, interfitting parts or fingers 64, 65, 66 of known construction.

There is nothing novel in this means for providing the interrupted rotation of the specified sleeve.

Gear 61 is pinned on a main-shaft 67 (Fig. 28), the latter being rotated by the following cooperating parts.

An electric-motor 68 (Fig. 1) carried on a supplemental shelf or support 69 on the main-frame 51, by means of a belt 71 and grooved pulleys 72 and 73, revolves a suitably-journaled, lower shaft 74 which by a sprocket chain and gear connection 75 revolves a short shaft 76 (Figs. 1 and 28) mounted to turn in a bearing in a standard 70 on the table-top and equipped with a pinion 77 meshing with a gear 78 fixed on and driving shaft 67.

Reverting now to Figure 15, sleeve 56 has a cylindrical, combined form-and-folder 81 fixedly secured thereto, as by a set-screw 82, whereby the member 81 rotates discontinuously with the sleeve, but, like such sleeve, it has no sliding or longitudinal movement.

Fitted inside of sleeve 56 and rotatable therewith and also slidable lengthwise therein is a second, smaller sleeve 83 the chamber in which extends from one end inwardly but not throughout its length, as is clearly shown.

This inner sleeve has an enlargement or head 84 the outer face of which may at times be in register with the adjacent end of the form-and-folder 81.

A round, disc-like stripping-support 85, by which is meant the support for the box parts during the application of the cover-paper thereto, of the same diameter as that of the form 81, by means of screws 86, 86 is demountably fastened to and concentric with the outer end of the inner sleeve 83.

As is clearly indicated in Figure 15, the end of sleeve 83 terminates short of the outer face of the round stripping-support 85 to provide a central cavity 87 which is in direct communication with the inner ends of a series of radial surface channels 88 in the face of the part 85 (Fig. 17) and desirably having larger cavities 89, such surface recesses constituting means for applying suction to the head of the box to hold it in place against the element 85.

Support 85 rotates periodically with the inner sleeve and also slides with it and at times away from the end of the form 81, and to facilitate such separation of parts vent-chambers 91, 91 present in the end of part 81 connect to the outer air through ports 92, 92 in member 81 and ports 93, 93 in support 85 which are in register with the chambers 91, 91.

Sleeve 83 is caused to rotate recurrently by a sliding pin and aperture connection 101 (Fig.

16) between the gear 601 and a collar 102 pinned at 103 on the sleeve, this arrangement of parts allowing the inner sleeve to slide inside of the outer sleeve 56 in which it snugly fits, this reciprocation being effected by a peripheral groove 104 in collar 102 in which channel the arms of a yoke 105 are accommodated and in which they are equipped with anti-friction rollers 106, the specified yoke (Figs. 16 and 36) constituting an end part of a rock-lever 107 fulcrumed at 108 on a ring 109 on jack-shaft 60, the lower end of such lever being bifurcated at 111 to straddle and to be guided by a floating bushing 112 on shaft 67, the lever having an antifriction roller 113 bearing on the face of a cam 114 fixed on the shaft (Fig. 28).

Thus as shaft 67 and the associated cam 114 revolve, they, through the mechanism described, produce the desired reciprocation of the inner sleeve 83 and its associated stripping-support 85, all without interference with the mechanical means provided to bring about the rotation of these parts.

The inner end portion of the rotary form 81 has one or more suction-ports 121 (Fig. 15) in its side, which port or ports connect with a circular groove 122 around the inside of the form and in register with a similar circular channel 123 in the outer face of the sleeve 56, such channel in turn by a passage 124 in the outer sleeve and a slot 125 through the inner sleeve communicating with a long, interior, central channel 126 of such inner sleeve and to which suction is applied at intervals.

The specified suction or vacuum is created by a suction-pump 131 (Fig. 1) in the lower part of the main-frame, the pump being driven by shaft 74 and having a suitable hose 132 connected to a valve-mechanism (Figs. 15 and 18) comprising a stationary collar 133 held against turning by a screw 130 connecting it with a portion of the standard 54 but permitting its slight axial movement, this collar having a chamber 134 in one side face with which the hose connects. (See in addition Figs. 20 to 24, inc.)

Beside such relatively stationary part of the valve is a round, oscillatory valve-member 135 having a recess 136 in the face thereof bearing on the part 133 and having a lower hole or port 137 extended completely through the member.

The third disc-like member 138 of the valve-mechanism (Figs. 15, 23 and 24) has a hub 139 on which the other two elements 133 and 135 are mounted, the three parts of the structure being maintained pressed together sidewise by springs 141 (Fig. 15) between the bearing-member 58 and the adjacent face of the element 133.

Member 138 by means of a set-screw 142 is fixed on, and therefore participates in the rotation of, the outer sleeve 56, and, on its face next to the middle member of the valve construction, it has a circular groove 143 at the same distance from the axis, so that it is constantly in register with the port 137 of the middle member 135 which only oscillates.

Channel 143 by right-angle passages 144 in part 138, passages 145 in element 56 and slots 146 in the internal sleeve 83 is in constant communication with the central chamber 126.

The specified middle valve-member 135 is designed to be rocked by means of a cam 147 (Fig. 40) on the main-shaft 67 coacting with a roller 148 on an arm 149 slotted to straddle the shaft for guiding purposes and having an extension 151, adjustable as to length, joining the arm to a fastening 158 secured to the outer surface of the part 135.

Therefore, so long as the port 137 connects chamber 134 with channel 143, suction will be exerted on the interior of the inner sleeve and on the port or ports 121 of the form 81 and the channels 88 and recesses 89 in the face of the support 85.

This same valve-mechanism 133, 135, 138 also governs the application and release of suction to a pasteboard-head feeder, hereinafter described in detail, and so far as this valve-mechanism is concerned in such operation, it involves a second cavity 161 in the same face of the part 133 as the chamber 134 and fairly close to such chamber, so that the recess 136 in the intermediate oscillatory valve-member may at times overlap the two recesses 134 and 161 and thereby apply vacuum or suction to a hose 162 connected to cavity 161.

Member 133 (Figs. 19 and 20) has two vent channels 163 and 164 in its side and extended inwardly from its periphery, and, accordingly, when port 137 registers with vent 163 the suction which previously existed in such port and the passages connected therewith is released or neutralized, and in similar manner, when cavity 136 registers with the vent passage 164 a comparable suction release takes place in the conduit 162 and the parts to which it is attached, which are set forth in detail hereinafter.

The strip of pasteboard, cardboard, or other suitable material to form the flange or ring of the box-element is wound convolutely on that part of the combined form-and-folder 81 equipped with the suction port or ports 121, and such ring or rim, in the present instance, may have one, two, or three thicknesses of the stock wound upon one another with sufficient end overlap, even though the form revolves only three complete revolutions at a time.

Such pasteboard stock is provided by a supply-roll 171 thereof (Fig. 3) of a width corresponding to the width or height of the box rim or flange, and from such roll the pasteboard strip 172 is fed over a guide-shoe 173, partially around a suction feed-roller 174, then downwardly forming a loop 175, and then up to the feeding means which advances its forward end to the underside of the cylindrical form 81, while the latter is stationary, and just below its suction port or ports 121.

Such feed mechanism for the front end of the pasteboard strip comprises a vertically-adjustable support 176 (Fig. 5) carrying a stationary inclined table 177 at its top and also having a bearing 178 (Fig. 6) for a short shaft 179 to which a gear 181 is pinned, the teeth of such gear being in mesh with those of a companion gear 182 on another suitably-journaled shaft 183 fitted with a third gear 184 in mesh with a rack 185 secured to the underside of a slide 186 and having on its top surface two spaced, parallel guides 187 and 188 between which the pasteboard strip 172 passes, an appropriately-mounted leaf-spring 189 bearing on the upper surface of the strip 172 to perform the double function of applying sufficient strain thereon to secure adequate tightness of winding on the rotary form and to prevent reverse movement of the strip when the slide moves back.

Oscillation of shaft 179 is brought about by an arm 191 (Fig. 4) pinned thereto and adjustably joined to a lengthwise-adjustable connection 192 (Fig. 4a) fixed to a slotted slide 193 pulled down by a spring 194 connected therewith and to the frame, the slot in part 193 accommodating the drive-shaft 67, the latter having a cam 195 coacting with an antifriction roller 196 on member 193.

Gear segment 201 (Figs. 5 and 6) loose on shaft 183 meshes with a correlated gear-segment 202 on a shaft 203, a yoke 204 carrying a cutter-blade 205 being fastened to the gear-sector 202 so that when the yoke and cutter blade swing upwardly the blade coacts with a stationary cutter-bar 206 to sever the section of the pasteboard strip which has previously been fed forwardly by the slide.

Gear-segment 201 forms a part of an arm 207 pivotally joined by an adjustable connection 208 to a slide-bar 209 straddling shaft 67 and tending to move upwardly under the influence of a coiled contractile spring 211 connected to the bar at one end and at its other or upper end to a stationary bracket 212.

At one side, bar 209 has a roller 213 riding on the edge of a cam 214 on shaft 67, and at its other side, the bar has a spring-actuated, pivoted rider 215 cooperating with another cam 216 also on shaft 67.

This rider is employed to give a quicker upward cutting movement to the bar under the action of spring 211 than could be had by the employment of the roller alone.

The spring effects the cutting operation, the roller and its cam normally holding the knife down, but just before the cutting is to occur, the roller and cam cease to act temporarily and their function is for a short time assumed by the pivoted rider and its cam for the purpose indicated.

As the pasteboard strip is fed forwardly to the form by the mechanism referred to, the loop 175 shortens and this action is employed to feed more of the strip from the supply-roll 171.

This result is accomplished in the following manner:

Turning now to the vacuum, strip-feed roller 174 mentioned above, by reference to Figures 1 and 41 to 44, inclusive, it will be observed that such roller is constantly rotated, being mounted on a suitably-journaled shaft 221 (Fig. 1) revolved by a small sprocket-wheel 222 riding on the outer side of a sprocket-chain 223 extending around a sprocket-wheel 224 on shaft 76 and a companion sprocket-wheel 225 on a lower, properly-journaled shaft 226 carrying a suction feed-roller 227 for feeding the paper-strip hereinafter referred to.

Such feed-roller 174 has two parallel sets of shallow surface channels 231 extended completely around the drum or roller, each such channel of one group or series having a port or passage connected therewith and opening out at the side of the roller at 232, the complete set of such ports forming a ring thereof, each channel of the other series having a similar port 233 at a different distance from the axis of the roller than the other set of holes.

A round valve-member 234 concentric with the drum and centrally apertured to receive the shaft 221 is held against turning by pin and hole connections 235 with a collar 236 on the shaft, such collar being held fixedly and immovably by attachment to the adjacent bearing 237 of the shaft, springs 238 in recesses in the two parts 174 and 234 pressing the latter against the face of the former.

Such contact face of the part 234 has two arcuate recesses 239, 241 concentric with and at the same distance from the axis of the shaft 221 as the two sets of ports 232, 233, the outer channel 239 being connected by a hose 242 (Figs. 41, 43, 44) to a valve 243 (Fig. 45) joined by another hose 244 to the suction-pump referred to or through any other connection.

Channel 239 is connected to channel 241 by a passage 245 which may be plugged when only one set of the channels 231 is used, the number of such channels employed depending upon the width of the pasteboard strip.

An arm 246 (Fig. 3) secured to the movable element of the valve 243 is adapted to close and open such valve more or less, depending upon the position of the arm, the latter having at its forward end a roller 247 around which the depending loop 175 of pasteboard extends, the arm by its own weight normally tending to swing downwardly so that its position is determined at all times by the length of the loop.

From what precedes, it should be understood that as each port 232 and/or 233 during the rotation of the drum or roller 174 comes into register with the one or more slots 239 and 241, suction will be applied to that part of the roller, provided the valve 243 is open, and, assuming that the valve is open, then a certain section only of the periphery of the roller is constantly subjected to suction and the cardboard strip will be drawn thereto and fed forwardly thereby; but, if the suction is cut off by the closing of the valve 243, then there will be no vacuum exerted on such portion of the drum and there will correspondingly be no forward feeding of the pasteboard strip as long as such condition continues.

It will be apparent, therefore, that the position of the arm 246 is determined by the length of the strip loop, the latter depending upon the consumption of the strip in the manufacture of the boxes, and the valve 243 is controlled by the arm 246 to regulate the feed of the strip as occasion requires, the length of the loop being thereby confined within predetermined limits.

Stated somewhat differently, when the loop shortens sufficiently to require a feed of the strip, the loop raises arm 246 thereby opening the valve 243 and applying the suction to the roller which grips the strip to itself and feeds it along, and when the loop is thereby lengthened a definite amount the arm descends and closes the valve, thereby terminating the suction and the feed of the roller on the strip.

We will now consider the means for applying the adhesive, such as glue, to the cardboard or pasteboard strip as it is being wound on the rotary form.

A shaft 251 (Figs. 2 and 5) having two universal-joints 252, 253 is revoluble in a fixed bearing 254 (Fig. 2) and two vertically-adjustable bearings 255, 256 in standards 257.

Between these uprights is a bracket 258 having an upstanding arm 259 at one end rockingly mounted on shaft 251, the bracket carrying a glue-pot 261 through the upper portion of which shaft 251 extends.

One end of such glue-vessel is beneath the form 81 and such part of the vessel has a metal, glue-applying roller 262 of a size to have its lower portion constantly immersed in the glue of the container.

This roller accomplishes a double result of pressing the cardboard or pasteboard strip against the rotary form and at the same time applying the adhesive to its outer surface, whereby to cause the cementing together of its superposed layers and to coat a portion of the outer surface of the finished box rim or flange.

For uniformity of glue application, it is desirable to positively rotate such roller, and for this purpose, shaft 251 (Fig. 5) is equipped with a sprocket-wheel 263 just outside of one wall of the vessel, and the shaft 264 of the glue-roller 262 is fitted with a sprocket-wheel 265, an idler 266 being positioned between the two wheels, the sprocket-chain 267 cooperating with all three wheels, as is clearly shown.

In order to mechanically rotate shaft 251 and the glue-roller through the intervening mechanism described, shaft 251 is revolved by shaft 76 through a sprocket-wheel and chain connection 260 (Fig. 2).

Referring now to Figure 32, it will be seen that the glue-pot is fitted with a hinged scraper 268 adjustable by a screw 269 to regulate the thickness of glue film on the roller, whereby to assure an even and definite application of adhesive to the pasteboard strip.

As is indicated in Figures 38 and 39, a long handle or bar 270 is fastened at 271 to the part 259 of the glue-pot-carrying bracket and a spring 272 secured at one end to such handle and at its opposite end to another bracket 273 on the frame tends to rock the glue-pot so as to bring its roller 262 upwardly against the pasteboard strip on the form, but such action is governed or controlled by a cam 274 (Fig. 5) acting in conjunction with the roller 275 on a slide 276 slotted for the accommodation of shaft 67, an adjustable connection 277 operatively joining the glue-pot and element 276.

Thus, the glue-pot and its roller are rocked up and down for the proper performance of their functions, the upward movement being effected by the spring and the downward movement by the cam.

Means are supplied to render the glue-pot 261 and its roller 262 temporarily inoperative, as occasion may require, and such interacting elements are shown in Figures 38 and 39, Figure 39 illustrating such means in a condition making the glue-pot and its roller operative, whereas Figure 38 shows the same mechanism with the glue-applying means locked against operation.

This mechanism includes a locking dog 281 hinged at 282 on a plate 283 secured to and depending from the long handle 270.

Auxiliary bell-crank handles 284 and 285 are rockingly mounted on the opposite ends of the main handle 270, these two supplemental handles being pivoted to the main handle in reverse relation as shown in Figure 38, that is to say, the end of the short arm of handle 284 is pivoted at 286 whereas the elbow of the handle 285 is pivoted at 287, the handle 284 having a leaf-spring 288 beneath it tending to rock it upwardly, the handle 285 having a similar leaf-spring 289 tending to rock it downwardly.

If the dog 281 occupies the position shown in Figure 39, the glue-pot and roller can swing upwardly, but if such dog is rocked upwardly to the position shown in Figure 38, it engages a fixed part of the machine and prevents such upward swinging of the glue-pot and its roller. To operate such lock or catch the following means are provided:

A bell-crank lever 290 is fulcrumed on the handle 270 and its one arm is connected by a link 291 to the handle 284 and by a link 292 to the handle 285, so that if either of the auxiliary handles is swung against the action of its individual spring toward the main handle 270, the bell-crank lever will be rocked on its fulcrum. The other arm or bell-crank lever 290 is connected by a link 293 to the dog 281 so that any rocking of the bell-crank lever causes the turning of the dog.

Now, if either handle 284 or 285 is swung on its pivot 286 or 287, then the dog 281 will be rocked up into operative position as shown in Figure 38, thereby rendering the glue-pot and its roller inoperative, but as soon as the machine is started again the mechanism actuating the glue-pot will move the parts slightly so that the dog 281 can swing down to inoperative position under the action of the spring 288 or 289 and the glue-pot will then step into the operation of the mechanism at the proper moment.

If, however, it is desired to lock the glue-pot down so that it will not again participate in its normal functions until manually released, additional means are provided as follows:

A hook or catch 294 is hinged on the plate 283 at 295, its upper end being joined to a rod 296, one end of which is pivotally connected to a rock arm or handle 297.

If the dog 281 has been rocked up and it is desired to lock it in such position, then by swinging the handle 297 or the rod 296 the hook 294 can be made to take over a stud 296 on the link 293, thereby holding the link down and the active end of the dog 281 up as shown in Figure 38.

Of course, to release the mechanism it will be necessary to rock the handle 297 or the rod 296 to the left and then at the proper moment the dog 281 will rock down as shown in Figure 39.

The means for pushing the completed ring or flange from the combined form-and-folder 81 onto the registering stripping-support 85, which is somewhat narrower than the flange, comprises two curved plates 301, 301 (Figs. 4 and 8), spaced apart and at opposite sides of the form, their slotted shanks 302, 302 being adjustably mounted by screws 303, 303 on a curved support 304 carried on the ends of a pair of parallel rods 305, 305 (Fig. 2) slidable in appropriate bearings in casting 54, the other ends of such rods being connected together by a cross-bar 306 (Fig. 2) the center portion of which, by means of a link 307 adjustable as to length, is connected to a rock-arm 308 (Figs. 1, 2, and 30), pinned to the upper end of an upright shaft 309, oscillatory in bearings 310 and 311 and equipped near its lower portion with a rock-arm 312 (Fig. 28) joined by a link 313 to a slide bar 314 reciprocatory in a front bearing 315 and a suitable guiding means 316 at the rear of the machine, the part 314 having a roller 317 riding on the periphery of a cam 318 mounted on shaft 67.

By reference to Figure 2, it will be seen that the cross-bar 306 and the associated parts are pulled to the left by a pair of coiled springs 319 connected at their right-hand ends to the cross-bar and at their left-hand ends to stationary parts of the machine.

From what precedes, it will be clear that the contraction of these springs causes the fingers 301 to travel to the left and to push the finished flange along the form and onto the stripping-support.

So far as described, the machine operates substantially as follows:

The pasteboard feeding mechanism advances the front end of the strip beneath the suction clamp or port 121 of the rotary form 81, while the latter is temporarily stationary, and a short distance beyond the center of the form to provide for proper overlap of the ends of the strip in the finished ring, and the glue-roller 262 ascends and performs the duplex action of pressing such advance end of the strip against the form, so that it covers and seals the suction-port, the vacuum, applied at about this time, thereafter holding the strip to the form.

The combined form-and-folder then rotates three revolutions with the glue-roller firmly pressing the strip against the form, which pressure, combined with the strain imposed on the strip by the spring 189, assures a tight convolute winding of the strip around the form, the glue applied to the outer surface of the strip on the form causing its overlying layers to adhere together.

At the proper moment, the knife 205 severs the strip from the supply, the cut-off part being of such length as to cause a slight overlap of the two ends of the strip on the form.

In the present instance, the strip is wound twice around the form, although the latter revolves three times.

The cam controlling the rise and descent of the glue-pot and its roller is so shaped that during a portion only of the second revolution of the form and during the corresponding part of the third revolution, say one-eighth or less, the glue-roller recedes from the pasteboard so that a small part of the outer surface of the completed flange or rim has no glue on it, all of the remainder of such exposed outside surface having had glue applied to it during the second revolution and also during the third revolution.

The purpose of avoiding supplying glue to a part of the face of the wound flange is that when the glue-coated cover-paper is later applied to the flange, its advance end may be placed on such unglued portion of the flange, thereby eliminating the possibility of the paper shifting its position or skidding on the flange by reason of the somewhat slippery quality of the glue when it is still wet.

The flange having been thus completed on the form, after the latter stops rotating, the suction thereon is terminated, and the pushers 301, 301 feed the flange along the form 81 and deliver it onto the concentric stripping-support 85 which is then close to the end of the form and on which it is thereafter united with a head by the cover-paper.

Referring now to the pasteboard, head-feeding part of the machine, it will be observed that casting 54 at its top is provided with a horizontal dovetail guideway 321 (Figs. 2, 3, 4, 5, 8, 9, 10) accommodating a slide 322 carrying an inclined magazine 323 in which the round pasteboard heads 324 are arranged side by side in vertical relation (Fig. 10), a follower or weight 325 bearing on the endmost head to assure the correct descent of all of the heads in the magazine.

The lowermost head in the magazine bears facewise against a vertically-arranged slide 326 (Fig. 3, 4, 8, 10, 11, 13) and is normally retained in the magazine and held from falling down through a narrow slot in the lower delivery end of the magazine by a spring-pressed, pivoted dog or retainer 327 (Figs. 10 and 11).

Slide 326 reciprocates vertically in guideways in a pair of spaced uprights 328, 328 (Fig. 4) forming part of the casting 329 which supports and which may form a portion of the magazine 323, the slide having an upward extension 331 (Figs. 8, 10) adjustable as to length and carrying a cross-head 332 near its top end, the terminal portions of the cross-head sliding in and being guided by slots in vertical bars 333, 333 secured to the sides of the casting 329, a pair of coiled contractile springs 334, 334, secured at their upper ends to the crosshead and at their lower ends to the casting, tending to pull the slide downwardly to correspondingly carry a box-head in the same direction.

At its upper end extension 331 has a slot therethrough equipped with a roller 335 (Figs. 8, 10), such slot accommodating, under the roller, a rock-arm 336 (Figs. 1, 10) fulcrumed at 337 on a standard 338 rising from the standard 70.

A block 339 adjustable along the arm 336 is connected by a link 341, capable of variation as to length, to an upright slotted slide 342 (Fig. 1) reciprocatory on a face of standard 70, one slot 343 (Fig. 33) of such slide accommodating a guide-roller 340 mounted on the casting, another slot of such slide straddling shaft 67, the slide having an antifriction roller 344 riding on the edge of its companion cam 345 on shaft 67.

By these means the head-feeding slide 326 is actuated, as will be readily understood, in proper-timed relation to the movements of the other parts of the mechanism.

In order to lock slide 342 temporarily inoperative, a dog 346 (Figs. 1, 2, 33, 34) is hinged on the stud 347 of roller 340 and its upper end is adapted to engage a shoulder 348 on the slide to prevent the latter from descent.

A rod 349 (Fig. 2) slidable in a bearing 1351 mounted on the casting 70 and fitted with an operating knob 1352 is connected to the dog 346 by a leaf-spring 1353 so that, when the rod is at its inner limit of movement, the leaf-spring tends to rock the dog away from the shoulder, whereas when the rod is at its outer limit of sliding movement, to the right as viewed in Figure 2, the spring tends to rock the dog toward the shoulder.

When the dog is manually caused to swing under the shoulder, it will maintain arm 336 (Fig. 1) almost at its uppermost position, thus permitting any required work to be performed on the other parts of the machine, but, as soon as the normal operation of the machine is again instituted, and, provided the rod 349 has been pushed in, when the cam lifts the slide the further small permissible amount, the dog or lock will automatically swing into inoperative position, thus thereafter allowing the ordinary working of the machine to take place.

The face of the head-feeding slide 326 toward the magazine has a pair of thin fingers 351, 351 (Figs. 10, 13) with sloping lower edges adjustably mounted thereon at 352, 352 (Fig. 8), such edges, during the descent of the slide, engaging the upper margin of the foremost head in the magazine and pushing it down out of the magazine and past the pivoted retaining dog or pawl 327.

A portion of the downward feed of the box-head is effected solely by the fingers 351, 351, and, as soon as they have registered such head with a V-shaped gauge, hereinafter referred to, the further downward travel of the head is performed at least in part by suction means about to be described.

As is shown in Figures 4, 10, 11 and 13, the lower part of the head-feeding slide 326 has a number of perforations 353 therethrough, and on the side of the slide opposite to that of the magazine, the slide has a hollow suction-box 354 (Figs. 4, 10, 11, 14) mounted thereon in a manner to permit change of position with its open face against the slide and in direct communication with a number of such perforations, the location to the latter so united to the suction-chamber 354 depending, of course, upon the position of the box on the slide. As shown in Figure 14, the face of the box 354 against the slide may have a plurality of circular channels connecting with its interior and also with the slide perforations.

The chamber in box 354 is connected by hose 162, hereinbefore mentioned, to valve 133—135, so that, when the recess 136 connects chambers 134 and 161, suction will be exerted in the box 354 and through the holes 353 onto the pasteboard head, thereby holding such head firmly against the slide 326 during its further downward travel.

The specified fingers 351, 351 locate the boxhead on the slide and the vacuum or suction maintains such proper position of the head on the slide and thereafter really performs the main head-feeding function, but, of course, the fingers nevertheless remain in position against the top edge of the head.

Turning now to the gauge-means for correctly positioning the pasteboard head on such feeding slide so that the subsequent operation will surely be properly performed with the required degree of accuracy, it will be noted that two parallel, horizontal rods 361, 362 (Figs. 1, 2, 4, 5, 8, 9, 29) slidable in bearings 363, 364, and 366, 367, respectively, are connected together by a cross-bar 368 (Fig. 2) by means of which they are slid back and forth in their bearings in synchronism.

To this end, the cross-bar 368 (Figs. 2, 30, 37) is joined at substantially its center by a link 369 to a horizontal arm 371 pinned to the top end of an upright rock-shaft 372 oscillatory in fixed upper and lower bearings 373, 374 (Figs. 1, 2, 28, 37).

Shaft 372 near its lower end has an arm 375 (Fig. 28) pinned thereon and connected by a link 376 to a horizontal slide-bar 377 slidable in a bearing-block 378 at the front of the machine and between two rollers 379, 379 (Fig. 37) on a bracket 381 at the rear portion of the table, shaft 67 extending through a slot in such slide-bar and having two cams 382 and 383 located on opposite sides of and adjacent to the slide-bar and coacting with rollers 384 and 385, respectively, on such bar, these two cams through the connecting mechanism illustrated and described positively reciprocating the two rods 361 and 362 in opposite directions.

At their outer ends, these two united rods carry a casting 391 of irregular contour on the top of which is adjustably mounted a V-shaped locating stop or gauge 392 (Figs. 1, 2, 13, 29) adapted by the reciprocation of the rods and casting to be brought into and out of cooperative relation with the pasteboard box-head on its feeding slide.

When this head-locating member 392 is at its inner limit of movement, wherein it is practically in contact with the end of casting 329, it is in the direct path of downward travel of the pasteboard head on the feeder, the latter, by means of its fingers, bringing the head down until its lower edge is correctly located and centered on the part 392, the fingers on the slide having been previously adjusted to exactly so position the head on the gauge.

As soon as this precise location of the head on its feeder has been accomplished, the suction is applied to the head feeder.

Thereafter, during the box-element delivery operation, that is, the discharge from the machine of the previously completed product, referred to hereinafter, the casting 391 and its V-gauge move out of the way of the slide 326 and it and its pasteboard head descend further to locate the head in correct register with the stripping-support 85.

After such final centering or registering of the head with the stripping-support 85 the latter and the related pushers 301, 301 with the already finished pasteboard flange, travel to the left until the support practically engages the head and the pushers feed the flange a little further so that its edge strikes the head, thereby assuring complete seating of the flange on the head and truing the flange, if any such action is needed.

As soon as the stripping-support 85 thus engages the head, valve 133—135—138 applies suction to the channels 88—89 in the face of the support and thereupon the suction on the feeding slide 326 terminates so that, from then on, the head adheres to the face of the support.

At the same time that the suction is imposed on the head through the stripping-support 85, the suction is also exerted at the rotary form port or ports 121 for the wrapping or winding of the next base or flange strip around the form.

We now have a box ring or flange on the stripping-support 85 and also a pasteboard head held to the end of such support by suction and in correct and exact register with the flange, all of these parts being spaced away from the adjacent end face of the unitary or consolidated form-and-folder 81.

Before the head reached such lowermost position, the advance end of the glue-coated coverpaper strip, unrolled from a supply-roll 394 (Fig. 3) and passed over a glue-roller 395, had been fed forwardly by its feeding mechanism, characterized as a whole 393, and which is of known construction and substantially like that of the pasteboard strip-feeding mechanism already set forth, including the strip-severing means, so that a detailed description thereof is apparently unnecessary, except to state that a light-weight rock-arm 396 (Fig. 3) operating a suction-controlling valve 397 regulating the application of suction to the peripherally-channeled suction feed-roller 227 for the paper, engages the paperstrip loop 398 (Fig. 3), whereby the length of such loop controls the pneumatic feed of the paper in practically the same way that the arm 246 governs the feed of the pasteboard strip by its length of loop 172. If desired, a leaf-spring 399 may strip the paper from its suction-roller 227 if it tends to cling thereto when it should not.

The initial advance of feed of the paper strip beyond the center of the stripping-support is such as to afford a sufficient length of stock for the paper to extend once around the box-element and to provide for overlapping the ends of the paper thereon.

It is now necessary to roll the adhesive coated paper onto the exterior of the associated box flange and head during their rotation with the stripping-support to bind them together and to fold the margins of the paper extended beyond the flange and head over into the mouth of the box-element and also over onto the outer face of the box-head.

It is important that such cover-paper be applied to the box parts in such a manner that it will not slip or slide thereon, and to this end two features are employed.

The first of these is that the front end of the glue-coated paper-strip is applied to that portion of the outer surface of the circular base or flange which is free from glue as presented above.

The second is that the pressure-roller which bears on the paper to cause its adequate adhesion to the pasteboard ring or base is power driven, thus avoiding any drag of the roller on the paper which would have a tendency to slide it out of place, resulting in misapplication.

We will now consider such paper-pressing roller and its associated parts.

A peripherally-grooved roller 401 (Figs. 8, 9, 49, 51) has a sprocket wheel 402 fixed thereto and the two are free to revolve on a shaft 403 fixed in a saddle 404 longitudinally adjustable by screws and slots 405, 405 on a plate 406 hinged near one end at 407 on a bracket 408 hinged at 409 on the main stationary support 411 of the cover-paper feeding-device, such plate 406 being angularly adjustable about its hinge 407 by an eccentric stud 412.

By means of these two adjustments the roller may be so positioned that the paper will be caused to be applied to the adjacent box flange and head in proper manner, the groove in the roller of course accommodating the extended edge or rim of the head.

An adjustable slide 413 (Fig. 9) straddling shaft 67 is pivotally connected by an adjustable extension 414 to the hinged bracket 408 and such slide is pulled upwardly by a coiled contractile spring 415 fastened thereto and to the stationary support of the paper-feeding appliance, and downwardly by cam 400.

Thus roller 401 is caused to rise and to descend in appropriate manner to accomplish the stated results, such roller being power-driven by means of a sprocket-chain 416 (Fig. 8) taking around the sprocket-wheel 402 and another sprocket-wheel 410 mounted on and rotating with shaft 264, this being the drive-shaft for revolving the glue-roller 262.

The specified grooved roller 401 rises and presses the paper, during about 1⅛ revolution of the stripping-support 85, against the pasteboard ring or flange and against the edge of the pasteboard head, the latter being accommodated in the groove of the roller, this excess over one revolution being employed for the purpose of rolling down the overlapping ends of the cover-paper.

For the purpose of additionally rolling the paper onto the ring or flange and head and of turning in the opposite protruding side margins of the cover-paper, a supplemental compound-roller is employed and it comprises a central, cylindrical section 417 (Fig. 50), an end disc section 418, and a third end disc part 419 all mounted to rotate and to slide on a shaft 421 rotatable in a yoke 422, the parts of the roller being yieldingly held together by a spring 420 encircling the shaft and pressing at one end against the roller member 419 and at its other end against a collar 423 fixed on the shaft.

This yoke 422, the length of the spaced arms of which is capable of variation, is mounted on a shaft 424 (Figs. 2 and 8) oscillatory in bearings in the standard 54, the shaft having an arm 425 (Fig. 30) spring pulled down at 426 and connected to a slide 427 apertured to receive shaft 67 and operated by a cam 428 on such shaft in association with a roller 429 on the slide.

The ascent of roller 417, 418, 419 is limited by an adjustable stop 431 (Figs. 2 and 31) on shaft 424 adapted to bear on a part of standard 54.

Such composite roller, like the roller 401, bears on the paper wound on the flange and head for about 1⅛ revolution of the stripping-support 85, but due to its position, its period of action is slightly later than that of roller 401, that is to say, it rises after roller 401 so that the paper will have reached the multiple roller before it ascends.

From what precedes it will be clear that the part 418 of the roller turns the margin of the paper down over the edge of the flange or ring into the space between the form 81 and the stripping-support 85 and that the element 419 of the roller turns the paper over onto the outer face of the head, thus binding the flange and head securely together.

If desired, a supplemental roller 432 may be used to assure the complete turn-in of the margin of the paper over the mouth of the pasteboard ring (see Fig. 8).

This roller is carried on an arm 433 on an appropriately supported rock-shaft 434 (Figs. 2, 8 and 37) actuated from shaft 67 by an arm 435 on shaft 434, a slotted member 436 through the slot of which the shaft 67 extends, a cam 437 on shaft 67, and a roller 438 on the part 436, all as will be readily understood.

This supplemental roller 432 may be omitted if desired, or if preferred, it may be so positioned as to roll on the cover-paper on the ring or flange directly adjacent to the head.

The paper having been applied and binding the flange or base and head together and its two opposite margins having been turned in by the two disc portions of the compound-roller and by the supplemental roller, if it is employed, it is necessary to fold the one extended margin of such paper into the mouth of the box-element and to cause it to adhere to the inner surface of the flange or base, and to press the other or opposite margin of the paper more firmly into adhering contact with the outer face of the box-head, and, for the accomplishment of this result, after the roller 401, the multiple-roller 417—418—419, and the additional roller 432 have receded from the support 85, the casting 391 moves inwardly.

This casting has a cylinder 441 (Figs. 10 and 29) in register with form 81 and stripping-support 85, and inside of such cylinder there is a ball thrust-bearing 442 having a coiled spring 440 in contact at one end with the corresponding wall of the chamber and at its other end with the bearing.

A shaft 443, hollow for a portion of its length, revolves in a bearing 444 in the casting, the apertured outer end of the shaft having a collar 450 against which a plurality of spring-pressed pins 445 press tending to move the shaft to the left as the parts are viewed in Figure 10, but allowing the shaft to yield lengthwise in the casting in minor degree.

At its other or inner end, shaft 443 has a disc 446 fixed thereon and faced with rubber 447, the disc and its facing being of substantially the same diameter as the pasteboard box-head.

As is indicated in Figure 10, the exposed face of the part 447 is somewhat concave and it has a central, raised rib 448 around its central opening 449 which is in direct communication with the axial chamber 451 inside of the shaft, the latter having an exterior circular groove 452 connected with the chamber 451 by a number of passages 453.

Bearing 444 (Fig. 29) has a passage 454 opening into and in register with the circular channel 452 and connected by a hose 455 to a duplex-valve 456 (Figs. 1, 3, 28) on shaft 67 and connected by a hose 457 to the source of suction.

By the means described, suction for the required periods is applied to this rubber-faced pressure-disc 446.

The cover-paper having been wrapped around the box parts and its edges having been folded over as explained, the casting 391 and its presser-head 446, 447 advance and engage the head and its folded paper, at about which time the suction-connection is made, and they push the box-element and the support 85 in toward the form 81, while all of these parts are revolving.

In so doing, the box-element is forced partway over the form 81, the latter folding the bent-over paper margin into the mouth of the box-element and causing it to adhere to the inner surface of the box-flange or base.

When stripping-support 85 in this movement engages form 81 and stops, the presser 446—447 applies adequate pressure to the paper margin folded over onto the box-head to cause its complete and proper adherence, and in this operation the spring 440 yields slightly to allow the pressing action stated.

The making of the box-element has now been completed and it must be discharged from the machine.

For this purpose, the suction of the presser, supplemented by mechanical means, is employed.

Casting 391 has a transverse cylinder 461 (Fig. 29) open at both ends, the center of the interior of the cylinder being joined by a connection 462 (Fig. 10) to a hose 463 associated with the duplex-valve 456 already referred to (see Figs. 3, 25, 26, 27), the same part of the valve being connected to the source of suction by a hose 464.

Each end of cylinder 461 has a plunger 465 slidable therein with a spring 474 in the cylinder and bearing on the two inner adjacent ends of the plungers.

Each plunger 465 is pivotally connected at 466 to an adjustable bell-crank lever 467 fulcrumed at 468 on the casting and having on the short arm of the lever a stop finger 469 operating between stop surfaces 471 and 472 of a stationary block 470 to limit the throw of the lever in both directions.

At its free end, each of such bell-crank levers carries an adjustable, curved, discharge-arm 473.

During the last portion of the third revolution of the form, stripping-support, box-element and presser, suction by means of the duplex-valve 456 is applied to the interior of cylinder 461, thereby drawing its two plungers inwardly against the action of the coiled spring 474, thus contracting the two arcuate delivery-arms 473, 473 close to the form and just beyond the mouth of the box-element.

Then the casting 391 and its presser-head and delivery-arms slide outwardly, or to the left as viewed in many of the figures of the drawings, and in so doing the box-element is positively removed by these arms from the form and stripping-support while they are completing the latter part of their final or third revolution.

As soon as the box-element leaves the support 85, the delivery-arms thereafter perform no useful function, but the box-element still adheres to the receding presser by reason of the continuance of its suction until the presser has reached its outer limit of travel.

The presser suction then ends by reason of the action of the valve 456 and the box-element may drop out of the machine, because it is released, but, to make certain of such delivery, the box-head feeding slide 326 is fitted with an outstanding projection or finger 475 (Fig. 10) which strikes the top of the box-element and dislodges it from the presser to insure its dropping out of the machine by gravity.

This arm or finger 475 contacts with the completed box-element at just the time the presser reaches its outer limit of travel, the head-feeder 326 having begun its descent even before the initiation of the removal of the box-element from the form by the delivery-arms.

From what precedes it should be clear that one complete box-element is produced during each cycle of operation of the machine which consists of three revolutions of the form and stripper-support and then a period of rest corresponding to what would otherwise be two revolutions of the form and support.

While one box-element is being completed on the stripping-support, the flange or base ring of the next box-element is being made on the form.

While the form and stripper-support are stationary, the materials to constitute the box-elements are being fed and this includes the pasteboard strip, the paper strip, and the pasteboard head, the pasteboard strip for the flange or base being fed under the form before the pushers have returned to their original positions, and, after they have resumed such initial positions, the rotation of the form and the wrapping of the pasteboard strip around it begin.

Before the pasteboard strip is fed under the form, the pasteboard-head feeder starts down and the end carriage 391 starts in, the head is fed to the V-shaped gauge and the head remains on such gauge for some time, suction being exerted on the head immediately after its correct location on the gauge, whereupon the gauge recedes almost to its final or outermost position.

The head is fed down about half way between the position which the gauge occupied and registers with the form and then the strip of pasteboard is fed to its form.

When the box-head is transferred from the head-feeder to the stripping-support, both suctions are exerted on the head for a short period and then that on the head-feeder is released so that the head remains held to the stripping-support.

Just preceding the initiation of the action of the head-feeder, the box-element delivery-arms are pulling off the preceding box-element and the finger 475 on the head-feeder, as has been explained above, kicks off the box element if it still adheres to the end presser.

The paper strip is fed under the stripping-support in position before the head reaches its lowest point in register with such support and then the paper is lifted against the flange and head by the pressing-roller 401.

Both of the paper rollers back up just before the presser advances to the head.

Both the paper and the pasteboard are severed from their supplies while traveling at full speed.

In this machine the pasteboard strip does not receive its glue until it begins to be wound around the form, the roller not only applying the glue but also affording sufficient pressure on the pasteboard to secure a tight winding thereof. This is an important feature of the construction, because when the machine is shut down, say for a few moments with the glue-pot and roller rocked down in inoperative position, there is no strip of adhesive coated pasteboard which is drying out as in the other machines, and, consequently, this machine can be started at any time and be in satisfactory operative condition.

Stated somewhat differently, in this appliance the glue is not applied to the pasteboard until the latter has reached the form so that when the machine is shut down temporarily the pores of the pasteboard supply strip, because the latter has not passed over a glue-roller, remain open, and because the knife acts on an uncoated pasteboard strip, it remains clean.

This mechanism involves many parts operated in one direction by a spring or springs and in the opposite direction by a cam. In all instances, with one exception, the spring carries the part to a position to do its work, the cam merely retracting such element in opposition to the action of the spring. The single exception noted is the casting 391 and its associated parts which are caused to move positively in opposite directions by cam action and without associated spring action. This is due to the fact that when this casting and the presser which it carries are advanced a substantial pressure must be exerted against the head of the box-element to properly perform the required function.

When the tail end of the strip of cover-paper is severed from the supply, there is a tendency for the trailing end of such paper to ride up somewhat sidewise on the edge of the box-element head, which is of slightly larger diameter than that of the box ring or flange. This is on somewhat the same principle that a belt tends to ride up on the center crowned portion of a pulley. The machine includes efficient means, shown perhaps most clearly in Figure 49, for holding this tail end of the paper strip in proper position and to prevent its skewing around under the influence stated. Accordingly, in order to put the needed strain on the tail end of the severed paper strip, a fixed bar 1000 under which the paper strip passes is employed, and on the rocking support 408 for the roller 401 a leaf-spring 1002 is mounted which presses the paper strip up against the fixed support 1000 and therefore strains its rear end so that it cannot skew off sidewise. Of course, when roller 401 descends spring 1002 goes with it. Owing to the fact that the elements 1000 and 1002 are located between the paper severing means and the stripping-support and close to the latter, this strain is imposed on the paper until practically all of it has been applied to the box-element.

From the foregoing it will be apparent that many of the parts of the mechanism are capable of adjustment in one way or another and this is provided for the purpose of permitting boxes of different dimensions to be made on the machine.

If a box-element of different size and of different depth is to be made on the machine, that is, a box having an outstanding rim like a pill box, it is only necessary to use another form, stripping-support, first grooved paper-roller and presser disc; the curved delivery arms or fingers having a certain range of sizes of boxes with which they will be capable of coacting with. Of course, many of the other parts of the machine will require adjustment to conform to the changes of these elements of the mechanism.

The machine illustrated and described is capable of making the box-flanges of one, two, or three convolutions of the pasteboard or other base or flange strip, but, obviously, a machine may be designed of the same general character which will produce flanges of a greater number of wound convolutions.

Those acquainted with this art will readily understand that many modifications may be incorporated in the machine shown and described without departure from the heart and essence of the invention as defined by the appended claims, and without the loss or sacrifice of any of the material or substantial benefits accruing from the employment of the invention.

I claim:

1. In a box-making machine, the combination of a combined form-and-folder, means to rotate said form-and-folder about its own axis intermittently, such being the sole movement thereof, means to wind a flange-strip on said form during each of its periods of rotation, means to cause overlying convolutions of said flange-strip to adhere together, a stripping-support of less width than that of said flange-strip and in axial register with said form-and-folder, means to rotate said stripping-support intermittently, means to transfer the wound flanges from said form-and-folder to said support, means to apply box-heads individually in succession to an end of said support, means to hold the box-heads on said support, means to apply a cover-strip to and wind the same on each assembled box-flange and box-head on said support during the rotation thereof, means to fold a margin of said cover-strip over onto the box-head, means to fold the opposite margin of said cover-strip over the mouth of the box-element thus produced, means to reciprocate said stripping-support toward and from said form-and-folder to receive the box-flanges from said form, to provide a gap between said form-and-folder and support into which the specified margin of the cover-strip may be folded over the mouth of the box-element, and to cause said form-and-folder to fold the margin of the cover-strip overlying the mouth of the box-element into the latter and against the inner surface of its flange, and means to remove the completed box-element from said stripping-support.

2. In a box-making machine, the combination of a combined form-and-folder, means to intermittently rotate said form-and-folder about its own axis, such being the sole movement thereof, means to feed the advance ends of dry flange-strips in succession to said form, means to grip the advance end of each such strip in its turn to said form, an adhesive-applying roller to press each said strip to the form and to apply adhesive to the outer surface thereof as the strip is wound on the form during the rotation thereof, means to move said roller toward and from said form, a stripping-support of less width than that of said flange-strip and in axial register with said form-and-folder, means to rotate said stripping-support intermittently, means to transfer the wound flanges from said form-and-folder to said support, means to apply box-heads individually in succession to an end of said support, means to hold the box-heads on said support, means to apply a cover-strip to and wind the same on each assembled box-flange and box-head on said support during the rotation thereof, means to fold a margin of said cover-strip over onto the box-head, means to fold the opposite margin of said cover-strip over the mouth of the box-element thus produced, means to reciprocate said stripping-support toward and from said form-and-folder to receive the box-flanges from said form, to provide a gap between said form-and-folder and support into which the specified margin of the cover-strip may be folded over the mouth of the box-element, and to cause said form-and-folder to fold the margin of the cover-strip overlying the mouth of the box-element into the latter and against the inner surface of its flange, and means to remove the completed box-element from said stripping-support.

3. In a box-making machine, the combination of a combined form-and-folder, means to rotate said form-and-folder about its own axis intermittently, such being the sole movement thereof, means to feed the advance end of a dry flange-strip to said form during each stationary period of said form-and-folder, means to grip such advance end of the strip to the form, an adhesive-applying roller to press said strip to the form, to apply adhesive to the outer surface thereof as the strip is wound on the form during the rotation thereof and to press the overlying convolutions of the strip together, means to move said roller toward and from said form, a stripping-support of less width than that of said flange-strip and in axial register with said form-and-folder, means to rotate said stripping-support intermittently, means to transfer the wound flanges from said form-and-folder to said support, means to apply box-heads individually in succession to an end of said support, means to hold the box-heads on said support, means to apply a cover-strip to and wind the same on each assembled box-flange and box-head on said support during the rotation thereof, means to fold a margin of said cover-strip over onto the box-head, means to fold the opposite margin of said cover-strip over the mouth of the box-element thus produced, means to reciprocate said stripping-support toward and from said form-and-folder to receive the box-flanges from said form, to provide a gap between said form-and-folder and support into which the specified margin of the cover-strip may be folded over the mouth of the box-element, and to cause said form-and-folder to fold the margin of the cover-strip overlying the mouth of the box-element into the latter and against the inner surface of its flange, and means to remove the completed box-element from said stripping-support.

4. In a box-making machine, the combination of a combined form-and-folder, means to rotate said form-and-folder about its own axis intermittently, such being the sole movement thereof, means to feed the advance ends of dry flange-strips in succession to said form, means to grip such advance end of each strip to the form to cause the winding thereof on the form during the rotation of the latter, an adhesive-applying roller, means to move said roller toward and from said strip and causing the roller to coat a portion only of the external surface of the outer convolution of the strip with adhesive, a stripping-support of less width than said flange-strip and in axial register with said form, means to rotate said stripping-support intermittently, means to transfer the wound flanges from said form to said support, means to apply box-heads individually in succession to an end of said support, means to hold the box-heads on said support, means to apply an adhesive-coated cover-strip to and to wind the same on each assembled box-flange and box-head on said support during the rotation thereof, with the advance end of the cover-strip applied to the uncoated portion of the external surface of the flange, means to fold a margin of said cover-strip over onto the box-head, means to fold the opposite margin of said cover-strip over the mouth of the box-element thus produced, means to reciprocate said stripping-support toward and from said form-and-folder to receive the box-flanges from said form, to provide a gap between said form-and-folder and support into which the specified margin of the cover-strip may be folded over the mouth of the box-element, and to cause said form-and-folder to fold the margin of the cover-strip overlying the mouth of the box-element into the latter and against the inner surface of its flange, and means to remove the completed box-element from said stripping-support.

5. The structure presented in claim 4 in which the advance end of a dry flange-strip is fed to the form during each stationary period of said form-and-folder.

6. In a box-making machine, the combination of a stripping-support adapted to support a box-flange composed of a convolutely-wound strip coated for a portion only of its outer periphery with an adhesive, means to hold a box-head against an end of said stripping-support in assembled relation with said box-flange, means to rotate said stripping-support intermittently, means to apply an adhesive-coated cover-strip to and to wind the same on said assembled box-flange and box-head on said support during the rotation thereof with the advance end of said cover-strip applied to the uncoated portion of the outer surface of said flange, means to fold a margin of said cover-strip over onto the box-head, means to fold the opposite margin of said cover-strip over the mouth of the box-element thus produced, means to fold said latter margin of the cover-strip into the mouth of said box-element and against the inner surface of its flange, and means to remove the completed box-element from said stripping-support.

7. In a box-making machine, the combination of a combined form-and-folder, means to rotate said form-and-folder about its own axis intermittently, such being the sole movement thereof, means to wind a flange-strip on said form during each of its periods of rotation, means to cause overlying convolutions of said flange-strip to adhere together, a stripping-support of less width than that of said flange-strip and in axial register with said form-and-folder, means to rotate said stripping-support intermittently, means to transfer the wound flanges from said form-and-folder to said support, a magazine for box-heads, a box-head conveyor, means to actuate said conveyor, means on said conveyor to engage the edge of a box-head in and to remove the head from said magazine, a gauge against which said conveyor and head-engaging means position said head, means to move said gauge into and out of head-engaging position, means to hold the head thus positioned by said gauge on said conveyor by suction, said conveyor thereafter carrying said head into register with an end of said stripping-support, means to transfer the head from said conveyor to and to hold it on said end of said stripping-support, means to apply an adhesive-coated cover-strip to and to wind the same on each assembled box-flange and head on said support during the rotation thereof, means to fold a margin of said cover-strip over onto the box-head, means to fold the opposite margin of said cover-strip over the mouth of the box-element thus produced, means to reciprocate said stripping-support toward and from said form-and-folder to receive the box-flanges from said form, to provide a gap between said form-and-folder and support into which the specified margin of the cover-strip may be folded over the mouth of the box-element, and to cause said form-and-folder to fold the margin of the cover-strip overlying the mouth of the box-element into the latter and against the inner surface of its flange, and means to remove the completed box-element from said stripping-support.

8. In a box-making machine, the combination of a stripping-support adapted to have box-flanges mounted thereon in succession, means to rotate said stripping-support intermittently, a magazine for box-heads, a box-head conveyor, means to actuate said conveyor, means on said conveyor to engage the edges of successive box-heads in and to remove them individually in succession from the magazine, a locating-gauge against which said conveyor and head-engaging means positions said heads in succession, means to move said gauge into and out of head-engaging position, means to hold each head positioned by said gauge on said conveyor by suction, said conveyor-actuating means thereafter carrying said head into register with an end of said stripping-support, means to transfer the head from said conveyor to and to hold it on said end of said stripping-support, means to apply an adhesive-coated cover-strip to and to wind the same on each assembled box-flange and box-head on said support during the rotation thereof, means to fold a margin of said cover-strip over onto the box-head, means to fold the opposite margin of said cover-strip over the mouth of the box-element thus produced, means to fold said last mentioned margin of said cover-strip into the mouth of the box and against the inner surface of its flange, and means to remove the completed box-element from said stripping-support.

9. In a box-making machine, the combination of a rotatable means, means to feed a strip of material intermittently to said rotatable means to be wound on the latter, a suction feed-roller on which said strip bears and by which it is adapted to be advanced to said feeding-means with a loop in the strip between said feed-roller and said feeding-means, a valve controlling the application of the suction to said feed-roller and thereby governing the advance of said strip by said roller, said roller being substantially inoperative on said strip when the suction is absent, and means cooperating with said loop and depending for its position upon the length of the loop regulating the action of said valve.

10. In a box-making machine, the combination of rotatable means, means to feed a strip of material intermittently to said rotatable means to be wound thereon, a suction feed-roller having a ring of spaced cavities around its outer surface, means to apply suction to each of said cavities for a portion only of its revolution, said portion being the same for all cavities, said strip being positioned to bear on said roller and to overlie the cavities of said portion and to be fed thereby when suction is present thereat to said feeding-means with a loop in the strip between said feed-roller and said feeding-means, a valve controlling the application of the suction to said feed-roller and thereby governing the advance of said strip by said roller, said roller being inoperative on said strip when the suction is absent, and means cooperating with said loop and dependent for its position upon the length of the loop regulating the action of said valve.

11. In a box-making machine, the combination of a rotatable member adapted to support an assembled box-flange and an associated box-head, means to rotate said member, flange and head, means to feed the advance end of an adhesive-coated cover-strip to said flange and head, means to cause said strip to adhere to and to wind on said flange and head during their rotation, means to sever the required portion of said strip from the remainder thereof, and means located between said member and severing-means operating to place a strain on the trailing end portion of the severed part of the strip to prevent it from skewing off sidewise during its application to the flange and head.

12. In a box-making machine, the combination of a rotatable member adapted to support an assembled box-flange and an associated box-head, means to rotate said member, flange and head, means to feed the advance end of an adhesive-coated cover-strip to said flange and head, means to cause said strip to adhere to and to wind on said flange and head during their rotation, and means located close to said rotatable member to place a strain on the trailing end portion of said strip to prevent it from skewing off sidewise during its application to said flange and head.

13. In a box-making machine, the combination of a form, means to rotate said form about its own axis only, means to wind a flange-strip on said form during rotation of the latter, means to apply a box-head to said form, and means to wind an adhesive-coated cover-strip on said flange and head to bind them together during rotation of the form.

14. In a box-making machine, the combination of a form, means to rotate said form about its own axis only, means to wind a flange-strip on itself in overlapped relation on said form during said rotation, means to apply a box-head to said form, and means to wind an adhesive-coated cover-strip on said flange and head to bind them together during rotation of the form.

15. In a box-making machine, the combination of a combined form-and-folder, means to rotate said form-and-folder about its own axis intermittently, such being the sole movement thereof, means to wind a flange-strip on said form during each of its periods of rotation, means to cause overlying convolutions of said flange-strip to adhere together, a stripping-support of less width than that of said flange-strip and in axial register with said form-and-folder, means to rotate said stripping-support intermittently, means to transfer the wound flanges from said form-and-folder to said support, means to apply a cover-strip to and to wind the same on each of the flanges on said support, means to fold a margin of said cover-strip over the mouth of said flange, means to reciprocate said stripping-support toward and from said form-and-folder to receive the flanges from said form-and-folder, to provide a gap between said form-and-folder and support into which the specified margin of the cover-paper may be folded over the mouth of the flange, and to cause said form-and-folder to fold said margin of the cover-strip overlying the mouth of the flange into said mouth and against the inner surface of the flange, and means to remove the covered flange from said stripping-support.

JOHN W. McCARTHY.